United States Patent
Wiplinger

(10) Patent No.: US 11,208,210 B2
(45) Date of Patent: Dec. 28, 2021

(54) FLOAT PLANE TECHNOLOGY

(71) Applicant: Wipaire, Inc., South St. Paul, MN (US)

(72) Inventor: Robert D. Wiplinger, Inver Grove Heights, MN (US)

(73) Assignee: WIPAIRE, INC., South St. Paul, MN (US)

(*) Notice: Subject to any disclaimer, the term of this patent is extended or adjusted under 35 U.S.C. 154(b) by 147 days.

(21) Appl. No.: 16/205,856

(22) Filed: Nov. 30, 2018

(65) Prior Publication Data

US 2019/0168873 A1 Jun. 6, 2019

Related U.S. Application Data

(60) Provisional application No. 62/593,358, filed on Dec. 1, 2017.

(51) Int. Cl.
*B64D 1/16* (2006.01)
*B64C 25/66* (2006.01)
(Continued)

(52) U.S. Cl.
CPC .................. *B64D 1/16* (2013.01); *B64C 5/02* (2013.01); *B64C 25/04* (2013.01); *B64C 25/06* (2013.01);
(Continued)

(58) Field of Classification Search
CPC .... B64D 1/16; B64D 2001/0072; B64D 5/02; B64D 25/04; B64D 25/06; B64D 25/34;
(Continued)

(56) References Cited

U.S. PATENT DOCUMENTS 1,765,328 A 6/1930 Fokker et al.
1,911,431 A * 5/1933 Cawley .................... B64D 1/16
244/136

(Continued)

OTHER PUBLICATIONS

Fire Boss LLC, Homepage, Retrieved online from <https://web.archive.org/web/20161202224642/http://www.firebossllc.com> on Mar. 18, 2018, dated Dec. 2, 2016, 1 page.

(Continued)

*Primary Examiner* — Brady W Frazier
(74) *Attorney, Agent, or Firm* — Fredrikson & Byron, P.A.

(57) ABSTRACT

The invention provides a firefighting float plane having a fuselage and two floats mounted to the fuselage. The fuselage has a water tank with open and closed configurations. In some embodiments, the water tank is integrated into the fuselage, and/or both the water tank and the fuselage have a generally triangular cross-sectional configuration. The water tank has a closed bottom in its closed configuration and an open bottom in its open configuration. In some embodiments, the plane has specified ratio of water tank holding capacity to total power of two engine assemblies. It can optionally also have the above-noted fuselage configuration, tank configuration, or both. In some embodiments, the plane has dual propellers, two engine assemblies, and two tail booms, optionally together with specified ratio of water tank holding capacity to total power of two engine assemblies. It may also have the above-noted fuselage configuration, tank configuration, or both.

22 Claims, 20 Drawing Sheets

(51) Int. Cl.
  *B64C 5/02* (2006.01)
  *B64C 25/06* (2006.01)
  *B64C 25/04* (2006.01)
  *B64C 1/00* (2006.01)
  *B64C 25/54* (2006.01)
  *B64C 25/34* (2006.01)

(52) U.S. Cl.
  CPC .............. *B64C 25/66* (2013.01); *B64C 25/34* (2013.01); *B64C 25/54* (2013.01); *B64C 2001/0072* (2013.01)

(58) Field of Classification Search
  CPC .............................. B64D 25/54; B64D 25/66; B64C 2001/0072; B64C 5/02; B64C 25/04; B64C 25/06; B64C 25/34; B64C 25/54; B64C 25/66
  USPC ......................................................... 244/101
  See application file for complete search history.

(56) References Cited

U.S. PATENT DOCUMENTS

| | | |
|---|---|---|
| D101,928 S | 11/1936 | Wilson et al. |
| D115,854 S | 7/1939 | Loudy |
| D136,296 S | 8/1943 | Sznycer |
| D138,795 S | 9/1944 | Stoughton |
| 2,359,652 A | 10/1944 | Larsen |
| D140,113 S | 1/1945 | Biasell |
| D141,426 S | 5/1945 | Patecell |
| 2,379,355 A * | 6/1945 | Hodgdon .............. B64C 23/005 244/5 |
| 2,534,722 A | 12/1950 | Meiklejohn, Jr. et al. |
| 2,665,092 A * | 1/1954 | Sands ...................... B64D 1/16 244/136 |
| 2,699,299 A * | 1/1955 | Herrick ................... B64C 27/24 244/7 A |
| D178,584 S | 8/1956 | Toth |
| D180,958 S | 9/1957 | Papadakos |
| D187,964 S | 5/1960 | Bensen |
| 2,958,486 A | 11/1960 | Bloomfield et al. |
| D192,337 S | 3/1962 | Skaggs |
| D197,933 S | 4/1964 | Sumner |
| D203,720 S | 2/1966 | Jarchow |
| 3,423,053 A * | 1/1969 | Hawkshaw .............. B64D 1/16 244/136 |
| 3,901,467 A * | 8/1975 | Hawkshaw .............. B64D 1/16 244/136 |
| D239,274 S | 3/1976 | Snyder |
| D239,522 S | 4/1976 | Wheatley |
| 4,165,059 A | 8/1979 | Summer |
| 4,298,175 A | 11/1981 | Earl |
| D273,005 S | 3/1984 | Mccomas |
| 4,645,143 A | 2/1987 | Coffy |
| D303,950 S | 10/1989 | Burgess |
| 4,962,978 A | 10/1990 | Weston |
| D319,805 S | 9/1991 | Wiegert |
| 5,065,958 A | 11/1991 | Stubstad et al. |
| 5,224,669 A | 7/1993 | Guimbal |
| 5,320,306 A * | 6/1994 | Gennaro ................. B64C 39/08 244/45 R |
| 5,462,242 A | 10/1995 | Collins et al. |
| D381,952 S | 8/1997 | Carter, Jr. |
| 5,782,427 A | 7/1998 | Hermach |
| 5,967,462 A | 10/1999 | Foster et al. |
| 6,113,028 A | 9/2000 | Lohse et al. |
| 6,244,538 B1 | 6/2001 | Howard et al. |
| D446,182 S | 8/2001 | Adam et al. |
| 6,367,738 B1 | 4/2002 | Wadleigh |
| 6,405,980 B1 * | 6/2002 | Carter, Jr. .............. B64C 27/02 244/17.25 |
| 6,427,942 B2 | 8/2002 | Howard et al. |
| 6,927,702 B2 | 8/2005 | Wiplinger |
| D543,248 S | 5/2007 | Winston |
| D559,329 S | 1/2008 | Connally et al. |
| 7,322,872 B2 | 1/2008 | Butler et al. |
| 7,552,895 B2 | 6/2009 | From |
| 7,918,417 B2 | 4/2011 | Mouille |
| 8,763,997 B2 | 7/2014 | Dunn |
| 8,919,694 B2 | 12/2014 | Amante et al. |
| 8,979,024 B2 | 3/2015 | Piccone et al. |
| 8,998,134 B2 | 4/2015 | Fews et al. |
| 9,085,361 B2 | 7/2015 | Prud'homme-Lacroix |
| D743,868 S | 11/2015 | Cummings et al. |
| D843,919 S | 3/2019 | Tzarnotzky et al. |
| D856,898 S | 8/2019 | Evulet |
| D856,899 S | 8/2019 | Evulet et al. |
| D865,636 S | 11/2019 | Reichert et al. |
| D868,627 S | 12/2019 | Evulet et al. |
| D868,668 S | 12/2019 | Parvizian et al. |
| D872,681 S | 1/2020 | Tzarnotzky et al. |
| D873,200 S | 1/2020 | Langford, III et al. |
| D873,201 S | 1/2020 | Langford, III et al. |
| D875,022 S | 2/2020 | Cummings |
| D880,401 S | 4/2020 | Mombrinie |
| D881,788 S | 4/2020 | Tian |
| 2006/0289697 A1* | 12/2006 | Clark ...................... B64C 39/04 244/55 |
| 2011/0036939 A1* | 2/2011 | Easter ....................... B60F 5/02 244/2 |
| 2011/0248118 A1* | 10/2011 | Meekins ................. B64C 25/66 244/101 |
| 2014/0158815 A1 | 6/2014 | Renteria |
| 2014/0158816 A1* | 6/2014 | DeLorean ............... B64C 27/32 244/12.4 |
| 2016/0279451 A1* | 9/2016 | Doten .................... A62C 3/0242 |
| 2017/0080267 A1* | 3/2017 | Wagner .................... B64D 1/16 |
| 2018/0297705 A1* | 10/2018 | Coulson ............... A62C 3/0242 |

OTHER PUBLICATIONS

Fire Boss LLC, About Us, Retrieved online from <https://web.archive.org/web/20161101162619/http://www.firebossllc.com:80/about.php> on Mar. 18, 2018, dated Nov. 1, 2016, 2 pages.
Fire Boss LLC, Specifications, Retrieved online from <https://web.archive.org/web/20161101163115/http://firebossllc.com/specs.php> on Mar. 18, 2018, dated Nov. 1, 2016, 3 pages.
Fire Boss LLC, Gallery, Retrieved online from <https://web.archive.org/web/20161101162717/http://firebossllc.com/gallery.php> on Mar. 18, 2018, dated Nov. 1, 2016, 1 page.
Fire Boss LLC, Index, Retrieved online from <https://web.archive.org/web/20161101162726/http://firebossllc.com/index.php> on Mar. 18, 2018, dated Nov. 1, 2016, 1 page.
Cessna 337 Portugal by WS-Clave, Retrieved online from <https://ws-clave.deviantart.com/art/Cessna-337-Portugal-450887310>, originally submitted on Apr. 29, 2014, 2 pages.
Cessna Skymaster, Wikipedia, Retrieved online from <https://web.archive.org/web/20161129212525/https://en.wikipedia.org/wiki/Cessna_Skymaster> on Mar. 18, 2018, dated Nov. 29, 2016, 6 pages.
Howarth, "End of the line for CL-415 water-bombers?" Aviation Week Network, Retrieved online from <http://aviationweek.com/blog/end-line-cl-415-water-bombers>, Jun. 12, 2013, 2 pages.
Dornier Seastar, Wikipedia, Retrieved online from <https://web.archive.org/web/20161017180310/https://en.wikipedia.org/wiki/Dornier_Seastar> on Mar. 18, 2018, dated Oct. 17, 2016, 3 pages.
Adam A500, Wikipedia, Retrieved online from <https://web.archive.org/web/20161005081942/https://en.wikipedia.org/wiki/Adam_A500> on Mar. 18, 2018, dated Oct. 5, 2016, 4 pages.
Wiplinger, Unpublished Design U.S. Appl. No. 29/628,082, filed Dec. 1, 2017, entitled Aircraft, 7 pages.
Cessna 337 Skymaster Compilation YouTube. by TheHDAviation. dated Jun. 19, 2017. found on line [Dec. 18, 2020] https://www.youtube.com/watch?v=8WoHxl9z6-Y.
Personal Airline Exchange Orders 50 Ampaire EEL Hybrid Electric Commuter Airplanes. by Nicolas Zart. dated Jun. 22, 2019. Found online [Dec. 18, 2020] https://cleantechnica.com/2019/06/22/personal-airline-exchange-orders-50-ampaire-eel-hybrid-electric-commuter-airplanes/.

(56) References Cited

OTHER PUBLICATIONS

U.S. Appl. No. 29/628,032, Restriction Requirement dated May 12, 2020, 8 pages.
U.S. Appl. No. 29/628,082, Response to Restriction Requirement dated May 12, 2020, filed Oct. 12, 2020, 5 pages.
U.S. Appl. No. 29/628,082, Non-Final Office Action dated Dec. 23, 2020, 9 pages.
U.S. Appl. No. 29/628,082, Response to Non-Final Office Action dated Dec. 23, 2020, filed Jun. 23, 2021, 8 pages.
Cessna O-2 Skymaster flying display at Sanicole Airshow 2015 by MUC-Spotter. dated Mar. 29, 2016, https://www.youtube.com/watch?v=vOiazjlb-3c.
Ampaire's Electric EEL Skymaster Makes Longest Flight Yet by Curt Epstein, dated Oct. 12, 2020, https://www.ainonline.com/aviation-news/business-aviation/2020-10-12/ampaires-electric-eel-skymaster-makes-longest-flight-yet.
Big Boys Toys UAE Arrow Gyrocopter YouTube reference by Big Boys Toys Global, dated Oct. 12, 2016, https://www.youtube.com/watch?v=7wikfnwvdY4.
U.S. Design U.S. Appl. No. 29/628,082, Non-Final Office Action dated Sep. 1, 2021, 34 pages.

\* cited by examiner

FLOAT PLANE TECHNOLOGY

CROSS REFERENCE

This application claims the benefit of U.S. Provisional Patent Application No. 62/593,358, filed Dec. 1, 2017, the entire contents of which are incorporated herein by reference.

FIELD OF THE INVENTION

The present invention relates to a float plane. More specifically, the present invention provides a float plane having a fuselage and first and second floats spaced apart from each other and connected to the fuselage.

BACKGROUND OF THE INVENTION

A float plane is a seaplane provided with a pair of pontoons, also known as floats. The floats are connected to the fuselage of the float plane. The floats are configured to provide buoyancy on water such that the float plane can takeoff from, and land on, a water surface.

As set forth in the present disclosure, it would be desirable to provide a float plane having a suspension that attaches first and second floats to the fuselage so as to maintain the first and second floats in vertical alignment positions during takeoff and landing. It would also be desirable to provide a float plane that overcomes one or more disadvantages of conventional float planes and firefighting airplanes known in the prior art. In certain embodiments, the present invention overcomes some disadvantages by providing a firefighting float plane having a water tank that is an integrated part of the fuselage. In some embodiments of this nature, the fuselage and the integrated water tank each have a generally triangular cross-sectional configuration. Additionally or alternatively, the invention can solve other problems by providing a firefighting float plane having a wing that is located at a higher position than a pilot position of the firefighting float plane and at a higher position than a rotation axis of a first, forward-facing propeller but that is located at a lower position than a rotation axis of a second, rearward-facing propeller. Still further, certain embodiments of the invention provide a firefighting float plane having a surprising ratio of water tank capacity to aircraft horsepower.

SUMMARY OF THE INVENTION

Certain embodiments of the invention provide a float plane having a fuselage, first and second floats, and a suspension connecting the first and second floats to the fuselage. The suspension comprises a spring connecting the first and second floats to the fuselage. The spring comprises a first elongated shaft section attached to the first float by a first pivot joint, and a second elongated shaft section attached to the second float by a second pivot joint. The first and second elongated shaft sections each comprise a composite material. The suspension further comprises first and second kicker struts. The first kicker strut extends between third and fourth pivot joints. The third pivot joint is located where the first kicker strut is attached to the first float, and the fourth pivot joint is located where the first kicker strut is attached to the fuselage. The second kicker strut extends between fifth and sixth pivot joints. The fifth pivot joint is located where the second kicker strut is attached to the second float, and the sixth pivot joint is located where the second kicker strut is attached to the fuselage.

In some embodiments, the invention provides a float plane having a fuselage and first and second floats. The first and second floats are spaced apart from each other and mounted to the fuselage. A water tank is provided that is an integrated part of the fuselage. The water tank has closed and open configurations. The water tank has a closed bottom when in its closed configuration and an open bottom when in its open configuration.

In other embodiments, the invention provides a float plane having a fuselage and first and second floats. The first and second floats are spaced apart from each other. The fuselage has a generally triangular cross-sectional configuration. The float plane includes a water tank having closed and open configurations. The water tank has a closed bottom when in its closed configuration and an open bottom when in its open configuration. The water tank also has a generally triangular cross-sectional configuration.

Certain embodiments of the invention provide a firefighting float plane having a fuselage, first and second propellers, a wing, two tail booms, and first and second floats. The first and second floats are spaced apart from each other and mounted to the fuselage. The fuselage is equipped with a water tank having closed and open configurations. The water tank has a closed bottom when in its closed configuration and an open bottom when in its open configuration. The first propeller is located at a nose of the fuselage. The wing is located at a higher position than a pilot position of the firefighting float plane so as not to obstruct downward viewing from the pilot position. The first propeller faces forward of the firefighting float plane, whereas the second propeller faces rearward of the firefighting float plane. The second, rearward-facing propeller is located between the two tail booms. The wing is located at a higher position than a rotation axis of the first, forward-facing propeller but is located at a lower position than a rotation axis of the second, rearward-facing propeller.

In certain other embodiments, the invention provides a firefighting float plane having a fuselage, a wing, first and second floats, a first propeller coupled to a first engine assembly and a second propeller coupled to a second engine assembly. The first and second floats are spaced apart from each other and mounted to the fuselage. The fuselage is equipped with a water tank having closed and open configurations. The water tank has a closed bottom when in its closed configuration and an open bottom when in its open configuration. The firefighting float plane has a ratio of a holding capacity of the water tank to total power of the two engine assemblies of greater than 0.5 gallons/horsepower in combination with the holding capacity of the water tank being greater than 1,000 gallons and the total power of the two engine assemblies being less than 4,000 horsepower.

DESCRIPTION OF VARIOUS EMBODIMENTS

Figure 1:
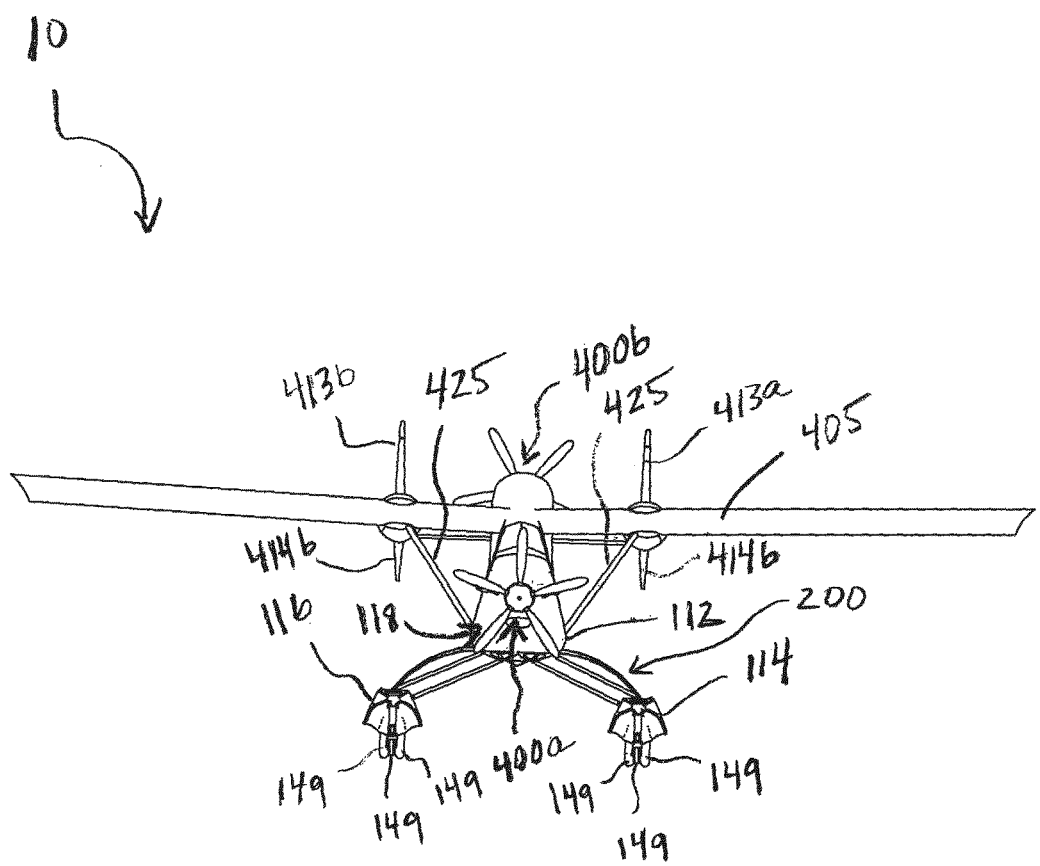
FIG. 1 is a front view of a float plane in accordance with certain embodiments of the present disclosure.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Figure 7:
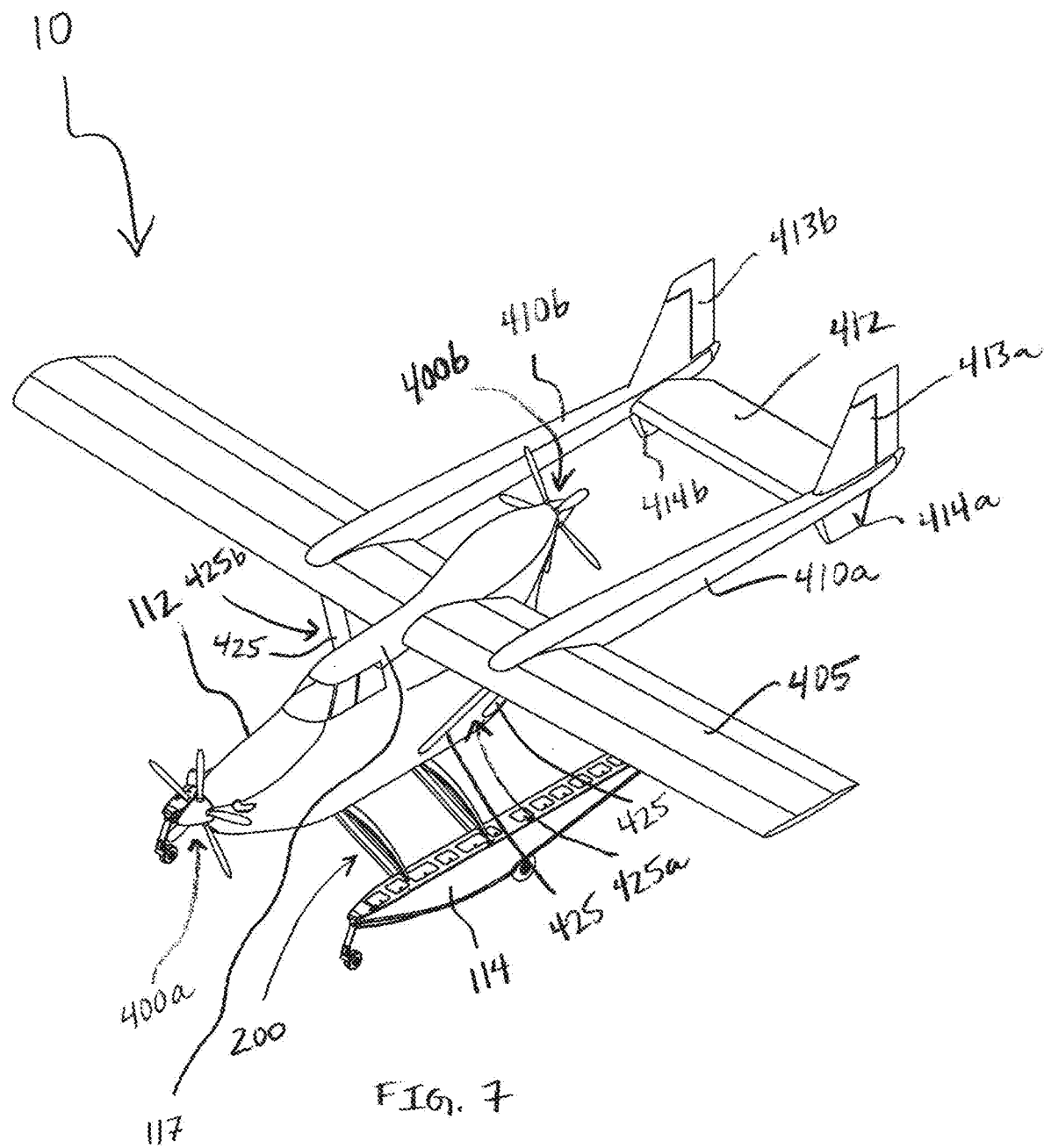
FIG. 7 is top perspective view of the float plane of FIG. 1.
Figure 8:
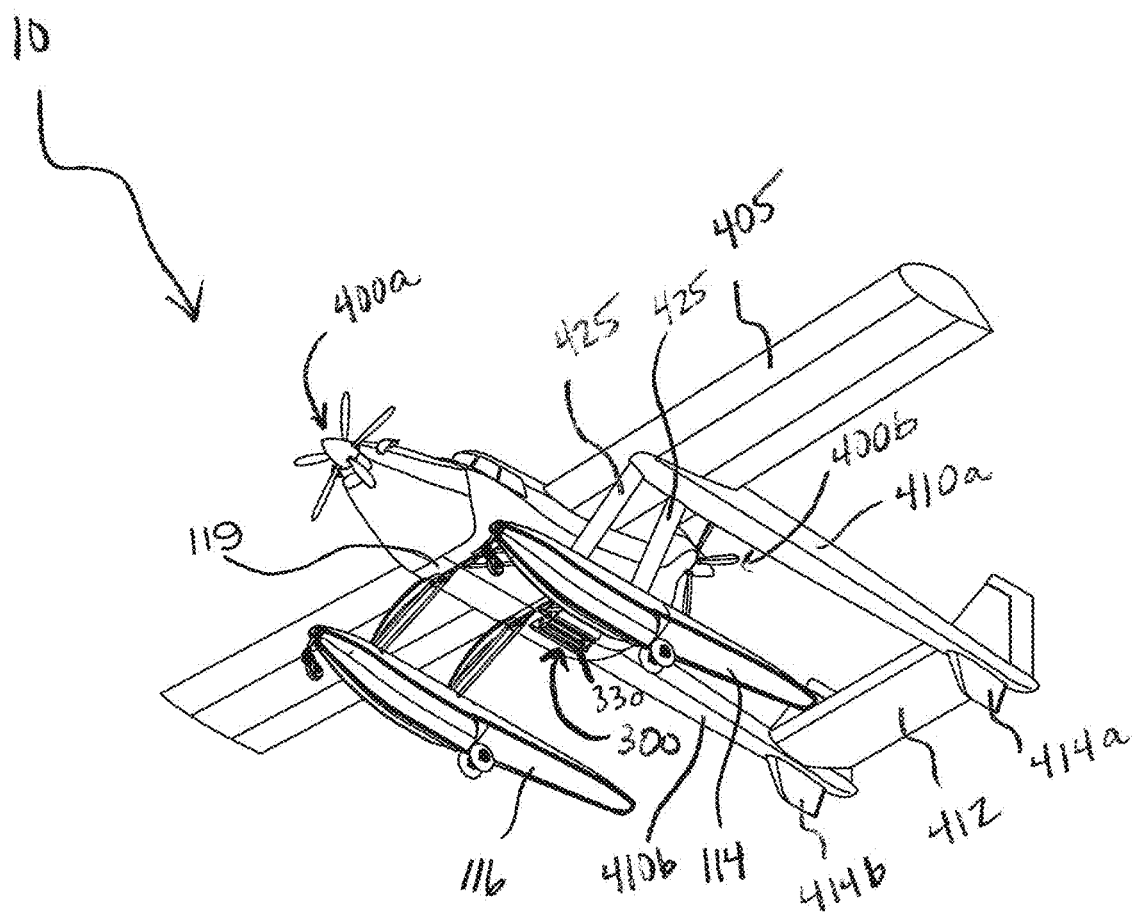
FIG. 8 is a bottom perspective view of the float plane of FIG. 1.

Referring to the drawings, and in particular FIGS. 7 and 8, there is shown an airplane in accordance with certain preferred embodiments of the present disclosure generally represented by reference numeral 10. The illustrated airplane 10 is a float plane, which is configured to takeoff from, and land on, a water surface (such as the surface of a lake, river, or ocean). The airplane 10 generally comprises a fuselage 112 and first 114 and second floats 116. The first 114 and second 116 floats are spaced apart from each other and connected to the fuselage 112. In more detail, the illustrated floats 114, 116 are mounted to the fuselage 112 such that the floats are held in positions spaced below and laterally offset from the fuselage.

The fuselage 112 defines a main body of the airplane. The fuselage 112 generally has a top region 117 and a bottom region (or "belly") 119 (see FIGS. 5 and 6), front (or "fore") 118 and rear (or "aft") 120 end regions (see FIGS. 1 and 2), and left (or "port") 122 and right (or "starboard") 124 side regions (see FIGS. 3 and 4). The front end region 118 includes a nose 126 of the fuselage 112, and the rear end region 120 includes a tail region 128 of the fuselage 112.

The first 114 and second 116 floats are a pair of pontoons mounted to the fuselage 112 so as to increase the buoyancy of the airplane 10. In more detail, the first 114 and second 116 floats make it possible for the aircraft to takeoff from, and land on, a water surface. The laterally spaced-apart first 114 and second 116 floats also provide increased lateral stability to the airplane 10 when on water. This provides an advantage over a flying boat, which does not include such floats but instead relies on its fuselage for buoyancy.

Figure 13:
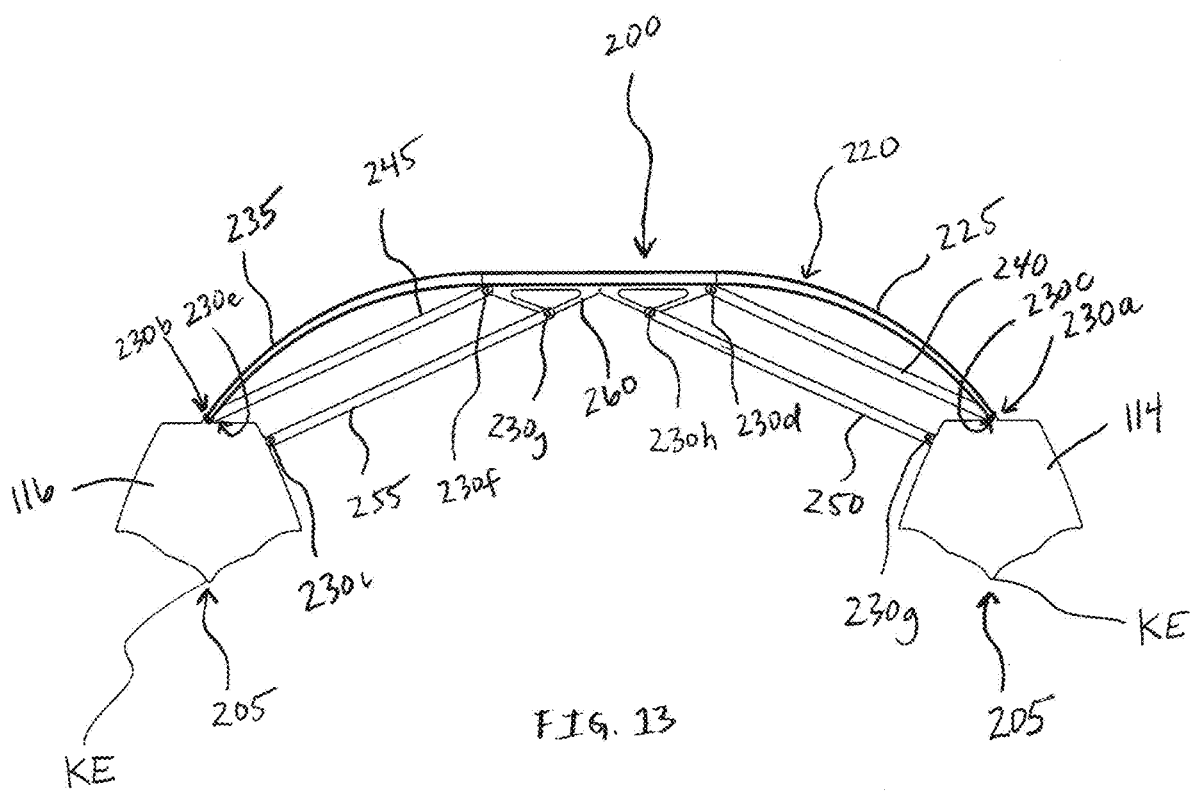
FIG. 13 is a detailed front view of a suspension connected to first and second floats of the float plane of FIG. 1 in accordance with certain embodiments of the present disclosure.

The first float 114 has a top surface 130, a bottom surface 132, a front (or "fore") end 134, a rear (or "aft") end 136, and a main region (or "span") 138 extending between the front 134 and rear 136 ends. Similarly, the second float 116 has a top surface 140, a bottom surface 142, a front (or "fore") end 144, a rear (or "aft") end 146, and a main region 148 extending between the front end 144 and the rear end 146. As is perhaps best appreciated by referring to FIG. 13, the bottom of each float preferably has a keel KE. This, however, is optional.

Figure 3:
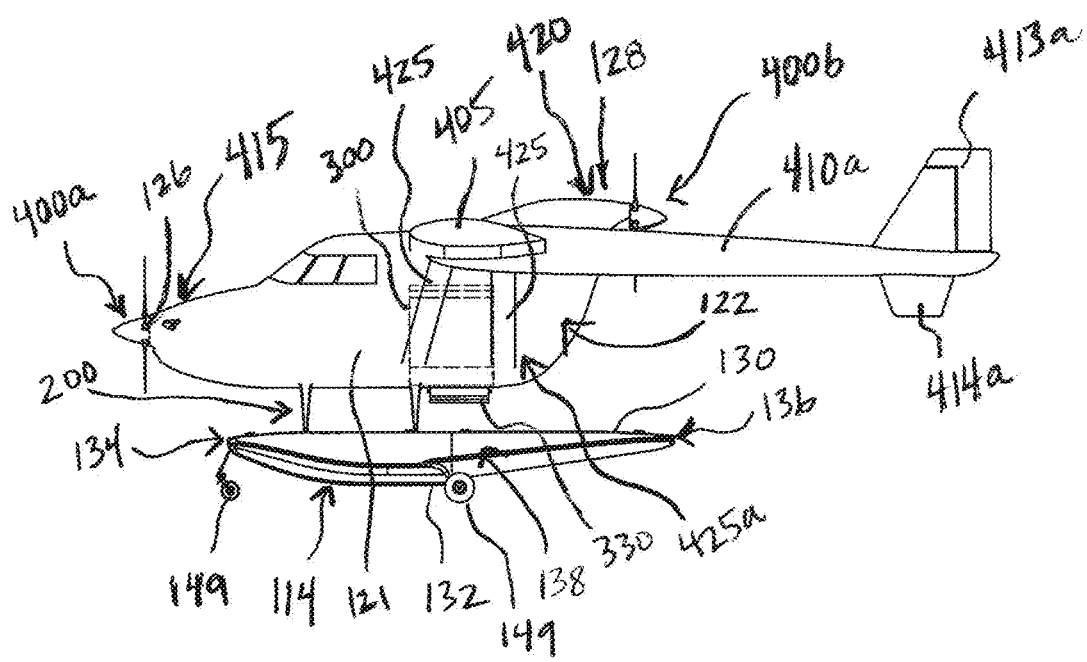
FIG. 3 is a left side view of the float plane of FIG. 1.
Figure 4:
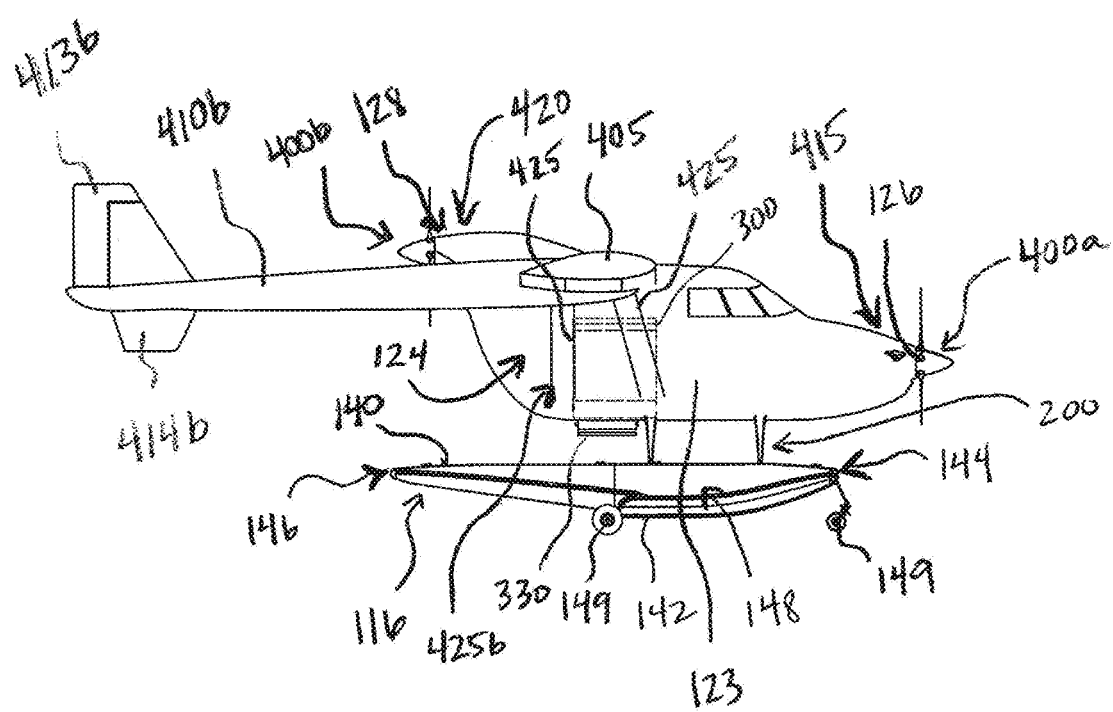
FIG. 4 is a right side view of the float plane of FIG. 1, wherein the second side view is opposite of the first side view.
Figure 20:
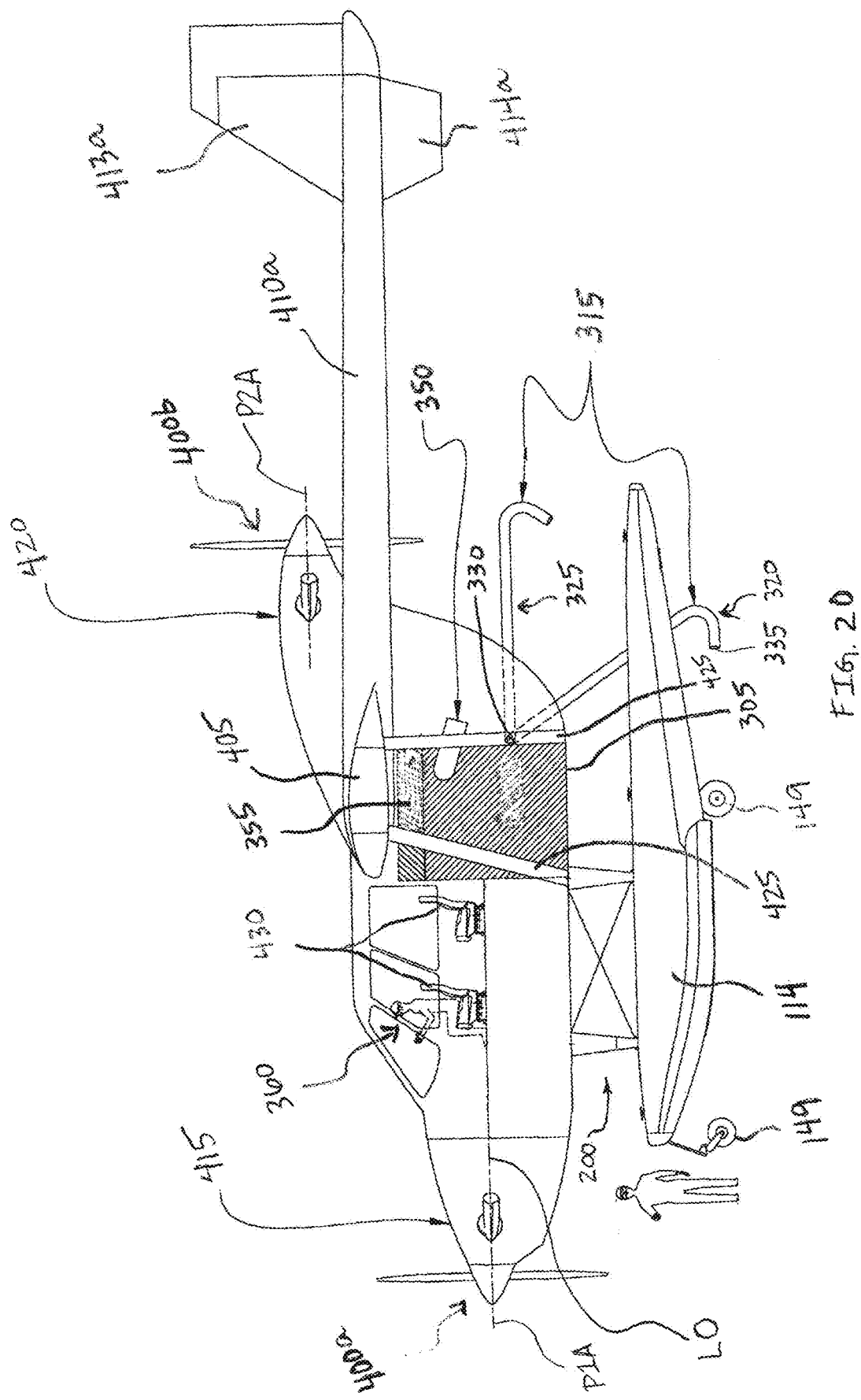
FIG. 20 is a schematic side view of a float plane in accordance with certain embodiments of the present disclosure.

The first 114 and second 116 floats can be of any float style and are not limited to the details shown in the figures. Thus, the shape and construction of the floats can vary. For example, the top surface 130 of the first float 114 and the top surface 140 of the second float 116 can be substantially parallel to horizontal, optionally with a slight downward taper at front ends 134, 144, as shown in FIG. 20. Alternatively, the top surfaces 130, 140 of the first 114 and second 116 floats can include no tapered sections (i.e., only straight sections), or could curve downwardly or upwardly at either or both of the front 134, 144 and rear 136, 146 ends. As shown in FIGS. 3 and 4, the bottom surface 132 of the first float 114 and the bottom surface 142 of the second float 116 can include straight sections, as well as curved sections. For example, the bottom surfaces 132, 142 can curve and/or taper upwardly at one or both of their front 134, 144 and rear 136, 146 ends (see FIGS. 3 and 4). In other embodiments, the bottom surfaces of the first and second floats can be parallel to horizontal. Many other float configurations are contemplated and within the scope of the present disclosure. If desired, the floats can each have a generally cylindrical tube shape. A variety of advantageous float styles can be purchased from Wipaire, Inc., of South St. Paul, Minn., USA.

In some embodiments, the first 114 and second 116 floats have walls comprising (e.g., consisting essentially of, or consisting of) a composite material. The composite material preferably comprises fiberglass, although other composite materials, such as carbon fiber, can be used. If desired, the walls of the first 114 and second 116 floats can be formed entirely of the composite material (other than optionally having some metal components), or the float walls can comprise both a composite material and a non-composite material (e.g., metal). In other embodiments, the floats are conventional aluminum floats.

Preferably, the fuselage 112 comprises a composite material. In more detail, the walls of the fuselage 112 can optionally consist (or consist essentially) of the composite material, or they can comprise both a composite material and a non-composite material (e.g., metal). The composite material of the fuselage 112 preferably is fiberglass, although carbon fiber or other composite materials can be used. As contrasted with a conventional fuselage, which is typically formed of an aircraft metal such as aluminum, a fuselage comprised of composite material is lighter in weight, will not rust, and can be readily formed into irregular shapes. In embodiments where both the fuselage walls and the float walls are formed of composite material, the composite material of the fuselage 112 can optionally be the same as, or different from, the composite material of the first 114 and second 116 floats.

Thus, the walls of the fuselage and the walls of the floats can advantageously both be formed of composite material, such as fiberglass. In embodiments of this nature, the relatively light weight of the fuselage and floats can help make it possible for an exceptionally large water tank to be used while keeping the aircraft horsepower surprisingly low.

In preferred embodiments, the airplane 10 is an amphibious aircraft, i.e., an aircraft configured to takeoff from, and land on, both land and water. To provide this dual capability, retractable wheels 149 preferably are attached to each of the first 114 and second 116 floats. When provided, the wheels 149 preferably are movable between an extended position and a retracted position. During operation, the desired position of the wheels 149 will, of course, depend on whether the airplane 10 will be taking off from, or landing on, land or water. When in the extended position, each wheel 149 projects downwardly from a respective one of the first 114 and second 116 floats such that the airplane 10 is configured to takeoff from, and land on, a land surface (such as a landing strip). When in the retracted position, the wheels 149 are retracted upwardly (e.g., into the floats) such that the airplane 10 is configured to takeoff from, and land on, a water surface. Although each of the first 114 and second 116 floats is shown as having three wheels 149, various numbers of wheels 149 can be provided for each float 114, 116, such as only two wheels 149 or more than three wheels 149. Moreover, in certain embodiments, the float plane 10 does not include any wheels 149, and thus, is not amphibious.

As shown in FIG. 3, one or more front wheels 149 can be attached to each of the front ends 134, 144 of the first 114 and second 116 floats, while one or more rear (or "midpoint") wheels 149 are attached to the main region 138 (e.g., a middle region) of the first float 114, and one or more rear wheels are attached to the main region 144 (e.g., a middle region) of the second float 116. The locations of the wheels on the floats, however, can vary from the locations shown in the drawings without departing from the spirit and scope of the present invention.

Suspension

In some embodiments, the airplane 10 has a particularly advantageous suspension 200 that connects the first 114 and second 114 floats to the fuselage 112. The suspension 200 is configured to absorb impact energy during takeoff and landing e.g., by flexing and/or pivoting, preferably while maintaining the first 114 and second 116 floats in vertical alignment positions 205. During flexing and/or pivoting of the suspension 200, vertical centerlines VC (see FIG. 16) of the first 114 and second 116 floats preferably are maintained parallel or substantially parallel to each other. Advantageously, the first 114 and second 116 floats do not deviate substantially from their vertical alignment positions 205, even when under considerable load. For example, when the airplane 10 lands on a water surface, force from landing on the water preferably does not cause the first 114 and second 116 floats to move away their vertical alignment positions 205 substantially. Rather, the suspension 200 preferably is configured such that the first 114 and second 116 floats remain in vertical alignment positions throughout takeoff and landing. In contrast, it will be appreciated that certain other float suspension configurations would leave the floats vulnerable to being angled outwardly (e.g., such that their keels point away from each other) substantially under the force of takeoff and landing.

Figure 10:
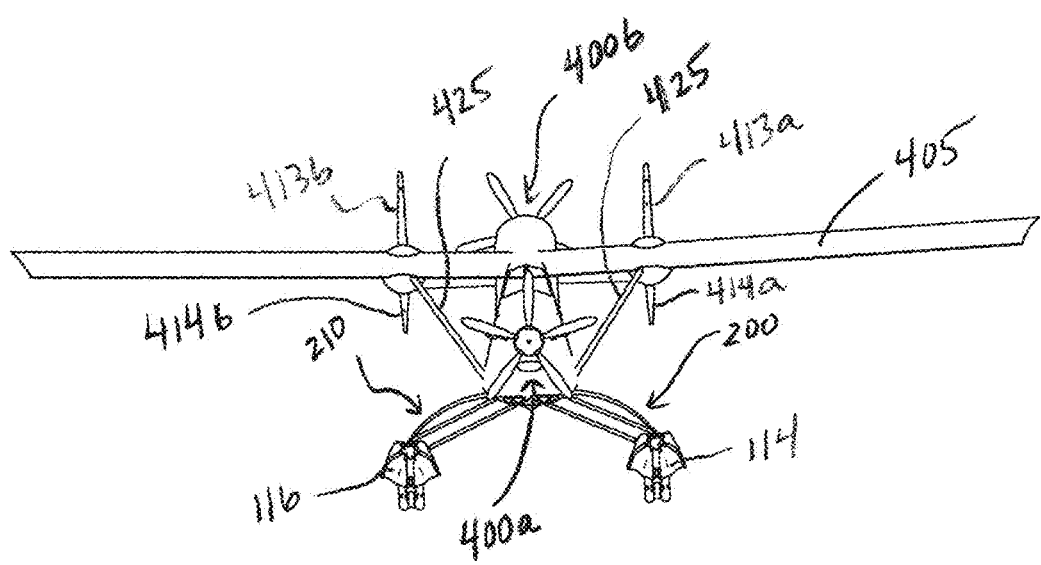
FIG. 10 is a front view of the float plane of FIG. 1, with the suspension shown in a relaxed position.
Figure 11:
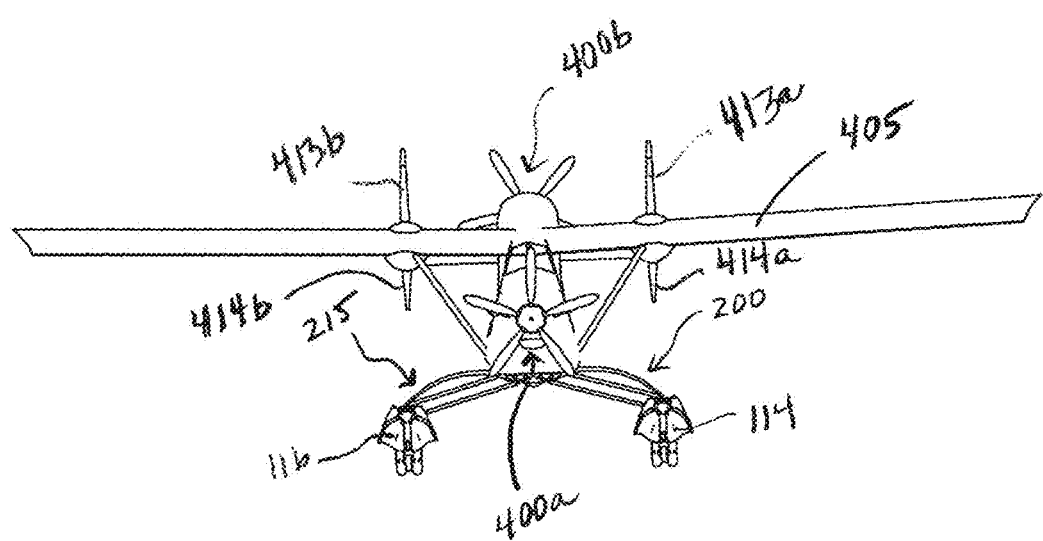
FIG. 11 is a front view of the float plane of FIG. 1, with the suspension shown in a stressed position.
Figure 16:
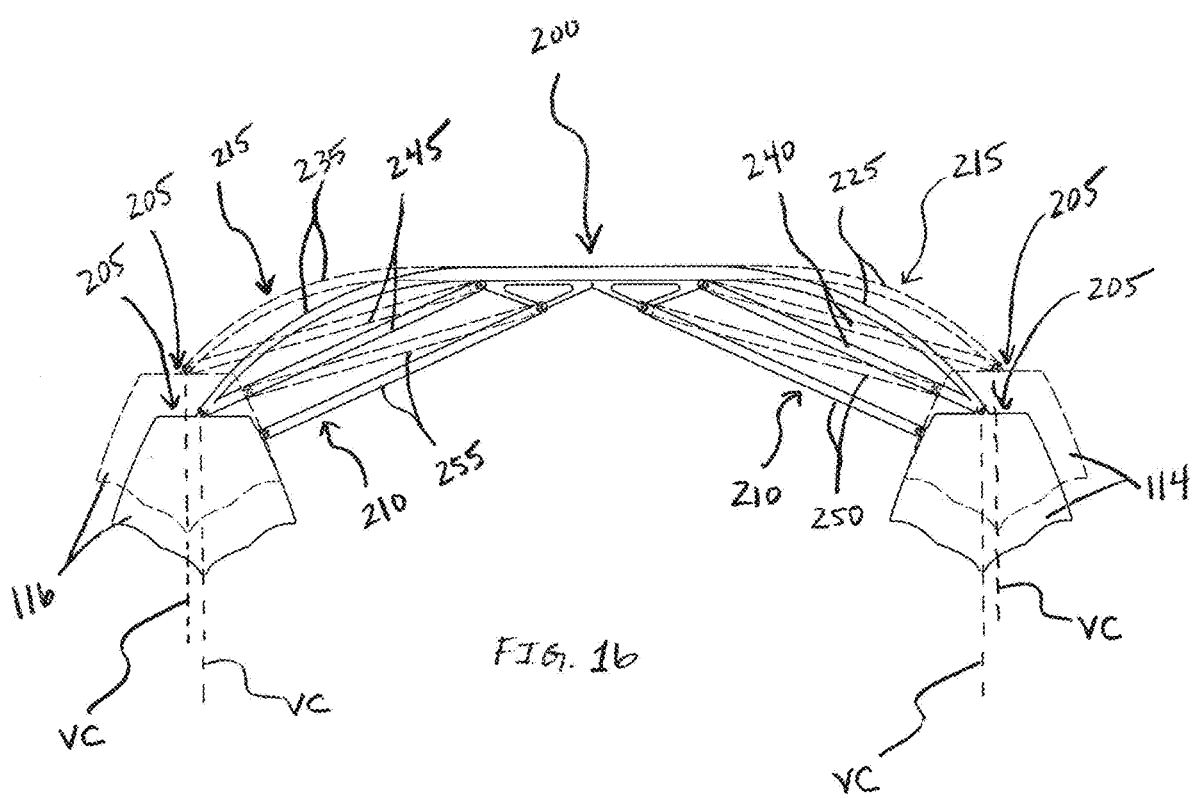
FIG. 16 is a detailed front view of a suspension connected to first and second floats, where the suspension is shown in both a relaxed position (solid lines) and a stressed position (dashed lines), in accordance with certain embodiments of the present disclosure.

FIG. 16 shows the suspension 200 in both a relaxed (or "default") position 210 (solid lines) and a stressed position 215 (dashed lines). When no takeoff or landing force is applied to the suspension 200, it is in the relaxed position 210 (see FIG. 10). When a takeoff or landing force is applied to the suspension 200, it is deformed (e.g., flexes and/or pivots) outwardly, thereby moving to a stressed position 215 (see FIG. 11). Thus, FIG. 16 illustrates a preferred embodiment wherein the first 114 and second 116 floats are maintained in vertical alignment positions 205 regardless of whether the suspension 200 is in a relaxed position 210 or a stressed position 215.

In certain embodiments, the airplane 10 has composite-wall floats and at least one suspension beam (e.g., spring 220) that connects the floats to the fuselage and is formed of a composite material. In addition, the airplane 10 can optionally have composite fuselage walls, as noted above.

Figure 9:
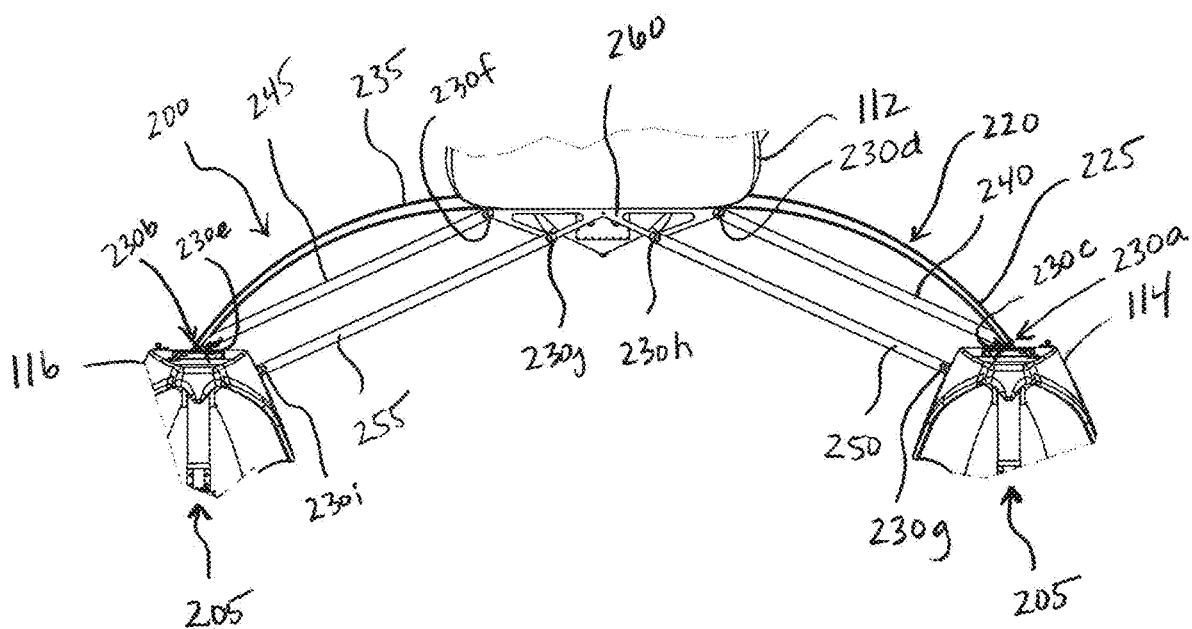
FIG. 9 is a broken-away front view of a lower portion of the float plane of FIG. 1 showing a suspension connecting first and second floats to a fuselage.

As shown in FIG. 9, the suspension 200 preferably comprises a spring 220 connecting the first 114 and second 116 floats to the fuselage 112. The spring 220 comprises a first elongated shaft section 225 attached to the first float 114 (preferably by a first pivot joint 230*a*) and a second elongated shaft section 235 attached to the second float 116 (preferably by a second pivot joint 230*b*). The first 225 and second 235 elongated shaft sections preferably each comprise a composite material. In the embodiments illustrated, the first 225 and second 235 elongated shaft sections are parts of a single elongated shaft, which defines the spring 220. In other embodiments, the first and second elongated shaft sections are separate and distinct sections that are connected together (or connected to the fuselage independently) by conventional means, for example, by mechanical fasteners. Preferably though, the spring 220 comprises a single composite shaft that connects both the first 114 and second 116 floats to the fuselage 112. The preferred composite material of the spring 220 is fiberglass, although carbon fiber or another composite can be used. In other embodiments, the spring is formed of metal.

The suspension 200 comprises first 240 and second 245 kicker struts (see FIG. 9). Preferably, the first kicker strut 240 extends between third 230*c* and fourth 230*d* pivot joints. In such cases, the third pivot joint 230*c* is located where the first kicker strut 240 is attached to the first float 114, and the fourth pivot joint 230*d* is located where the first kicker strut 240 is attached to the fuselage 112. The second kicker strut 245 preferably extends between fifth 230*e* and sixth 230*f* pivot joints. In such cases, the fifth pivot joint 230*e* is located where the second kicker strut 245 is attached to the second float 116, and the sixth pivot joint 230*f* is located where the second kicker strut 245 is attached to the fuselage 112. Thus, the illustrated suspension includes at least two kicker struts, each connected to the fuselage and to one of the floats by two respective pivot joints.

Figure 18:
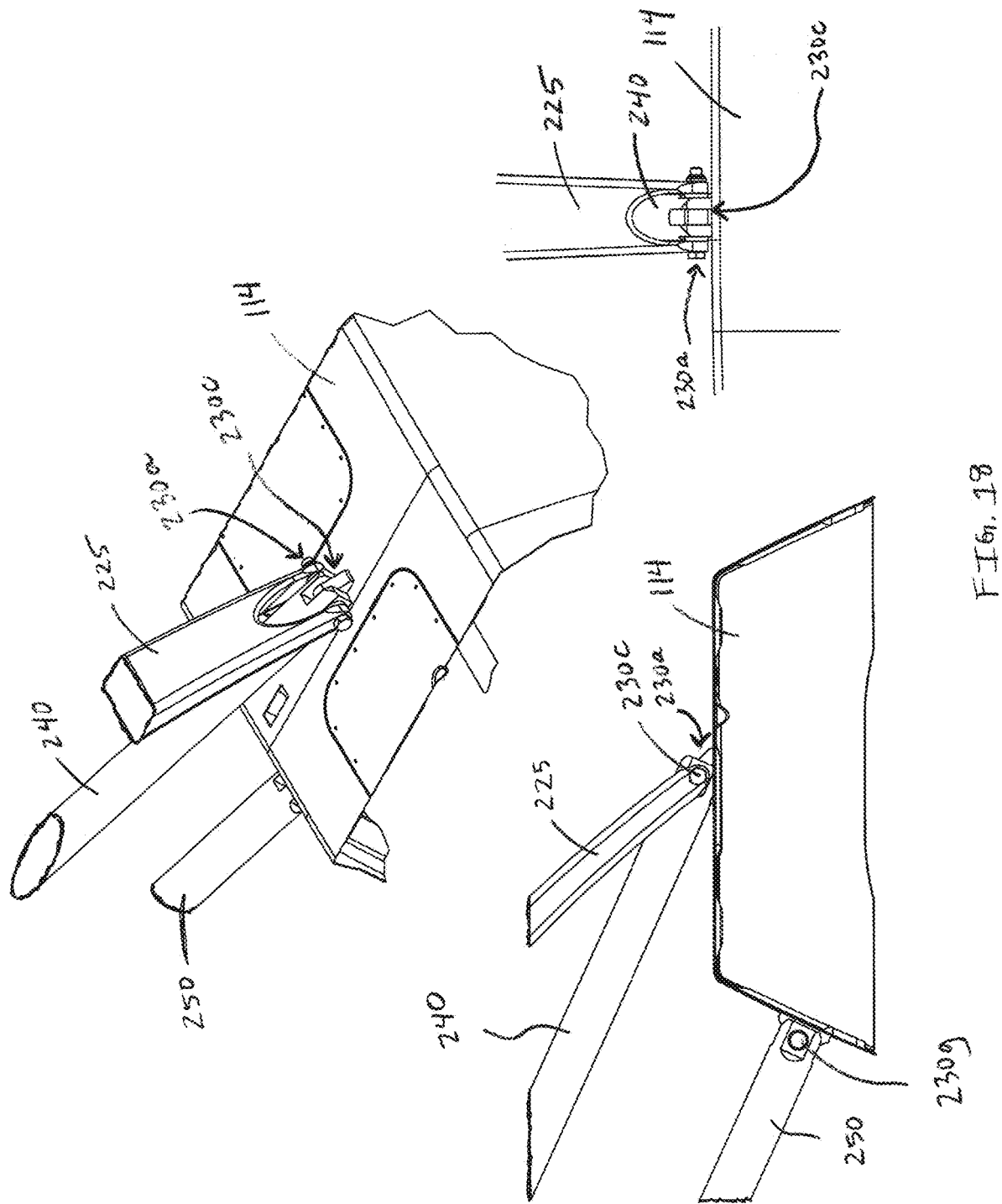
FIG. 18 shows multiple broken-away views of a suspension assembly attached to a first float in accordance with certain embodiments of the present disclosure.

In the embodiments illustrated, the third pivot joint 230*c* can optionally be at the same location as the first pivot joint 230*a* (see FIGS. 9 and 18). Similarly, the fourth pivot joint 230*d* can optionally be at the same location as the second pivot joint 230*b* (see FIGS. 9 and 18). In other cases, the first and third pivot joints are spaced apart longitudinally, and/or the second and fourth pivot joints are spaced apart longitudinally.

Figure 14:
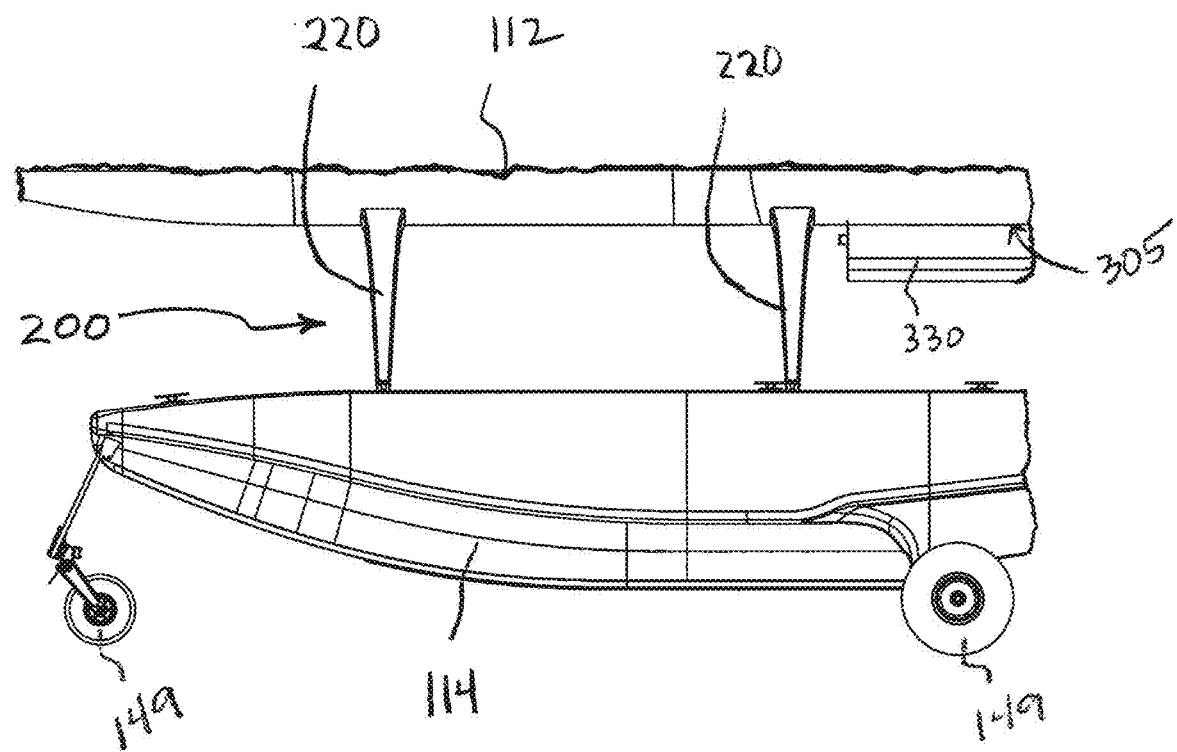
FIG. 14 is a broken-away side view of a lower portion of the float plane of FIG. 1.
Figure 15:
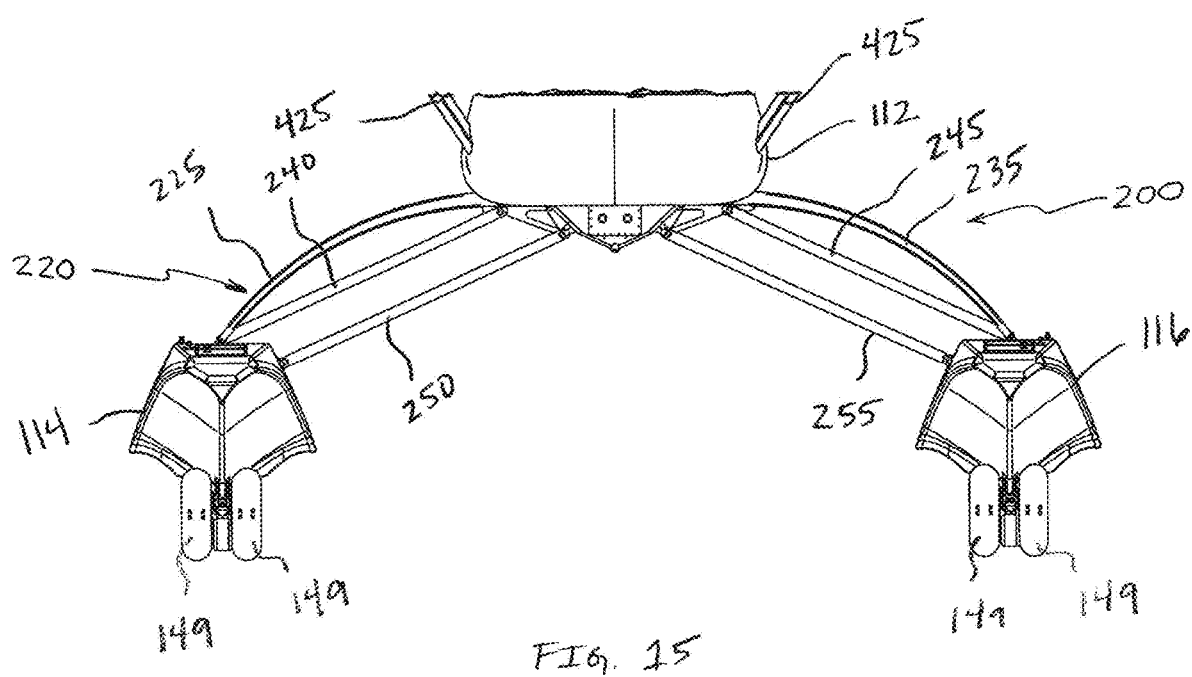
FIG. 15 is a partially broken-away detailed rear view of a lower portion of the float plane of FIG. 1 showing a suspension connecting first and second floats to a fuselage in accordance with certain embodiments of the present disclosure.

As is perhaps best shown in FIGS. 7, 8, and 14, the suspension 200 preferably comprises two suspension assemblies spaced apart longitudinally. As illustrated, the two floats can thus be mounted to the fuselage by two longitudinally spaced apart suspension assemblies. In the embodiments illustrated, each suspension assembly comprises a spring 220 and at least two kicker struts of the nature described herein.

Figure 19:
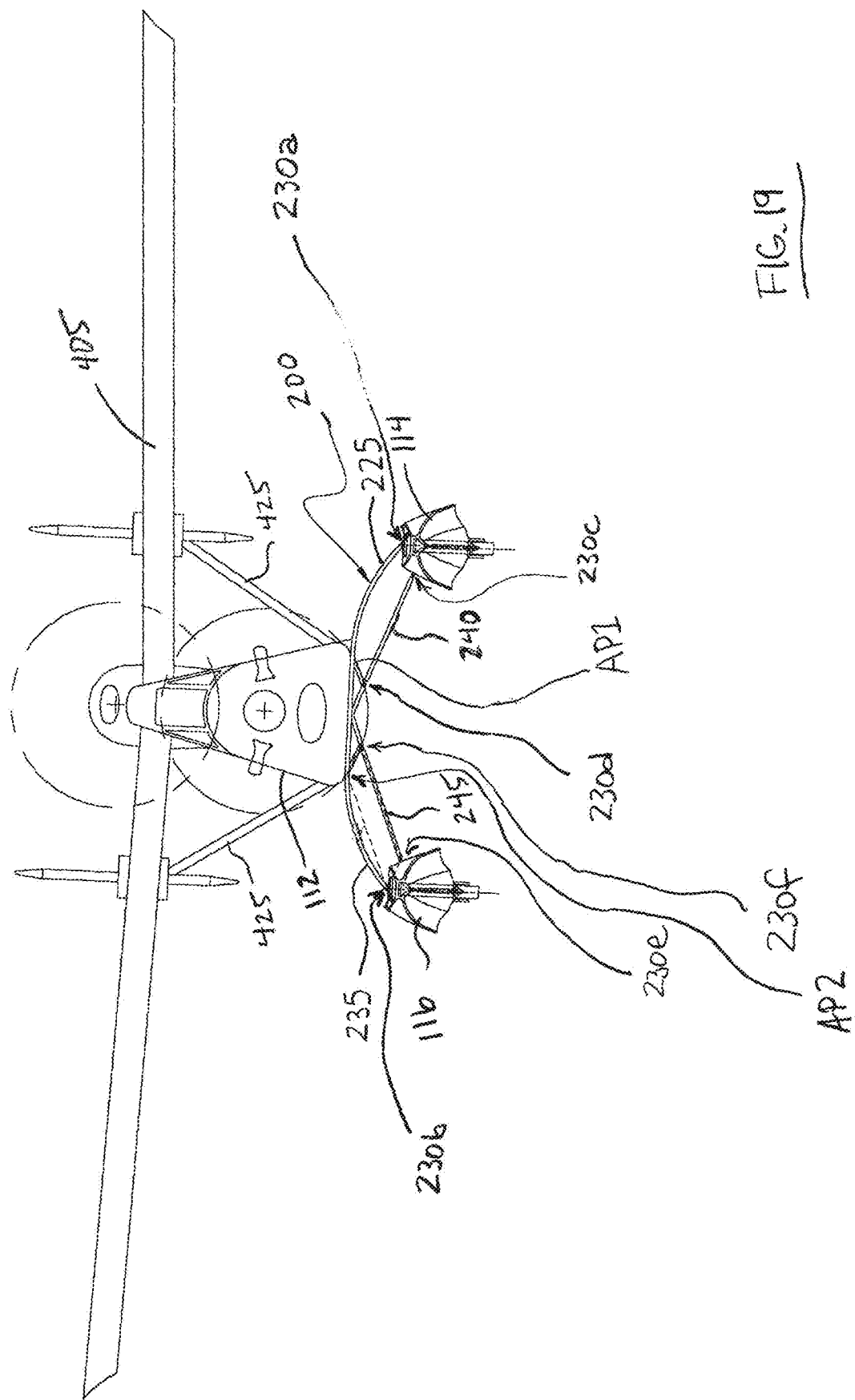
FIG. 19 is a front view of an alternate embodiment of a float plane, where a suspension has fewer kicker struts than are provided in the embodiment of FIG. 1.

In some embodiments, each suspension assembly has a spring and only two kicker struts, namely the first kicker strut 240 and the second kicker strut 245 (see FIG. 19). In other embodiments (see FIG. 9), each suspension assembly has a spring, first 240 and second 245 kicker struts, as well as third 250 and fourth 255 kicker struts. When provided, the third kicker strut 250 preferably extends between seventh 230*g* and eighth 230*h* pivot joints, and the fourth kicker strut 255 preferably extends between ninth 230*i* and tenth 230*j* pivot joints. In FIG. 9, the seventh pivot joint 230*g* is located where the third kicker strut 250 is attached to the first float 114; the eighth pivot joint 230*h* is located where the third kicker strut 250 is attached to the fuselage 112; the ninth pivot joint 230*i* is located where the fourth kicker strut 255 is attached to the second float 116; and the tenth pivot joint 230*j* is located where the fourth kicker strut 255 is attached to the fuselage 112. Thus, FIG. 9 is representative of embodiments wherein each suspension assembly of the suspension 200 has a spring 220 and at least two pairs of kicker struts, each preferably extending between two pivot joints (e.g., one at the fuselage, the other at a float).

If desired, the first kicker strut 240 can be longitudinally aligned with an adjacent third kicker strut 250, e.g., such that the first kicker strut 240 is positioned above and generally parallel to the adjacent third kicker strut 250. Similarly, the second kicker strut 245 can be longitudinally aligned with an adjacent fourth kicker strut 255, e.g., such that the second kicker strut 245 is positioned above and parallel to the adjacent fourth kicker strut 255. Alternatively, the first kicker strut 240 can be longitudinally offset from an adjacent third kicker strut 250, and/or the second kicker strut 245 can be longitudinally offset from the adjacent fourth kicker strut 255.

The kicker struts can be attached to the fuselage 112 either directly or indirectly. In some embodiments, a mount frame 260 is provided that mounts one or more (optionally all) of the kicker struts to the fuselage 112. When provided, the mount frame 260 can be anchored to the bottom region 119 of the fuselage 112 by any conventional means, including various mechanical fasteners. In the embodiment of FIG. 9, the fourth 230*d*, sixth 230*f*, eighth 230*h*, and tenth 230*j* pivot joints are defined in part by a mount frame 260. In embodiments where there is no mount frame 260 of this nature, the fourth 230*d*, sixth 230*f*, eighth 230*h*, and tenth 230*j* pivot joints can be located on some other structure on the bottom region 119 (i.e., on a bottom side 125) of the fuselage 112. Thus, FIG. 9 is representative of embodiments wherein each suspension assembly includes at least four pivot joints that respectively connect at least for suspension beams to the bottom of the fuselage.

As is perhaps best shown in FIG. 9, each suspension assembly of the suspension 200 can optionally include at least one suspension beam (e.g., spring 220 and kicker struts 240, 245) each attached (e.g., pivotally) to a top surface 130 of a float, and at least one other suspension beam (e.g., kicker struts 250, 255) each attached to a side surface (e.g., an interior side surface) of a float. In the embodiments illustrated, each suspension assembly comprises a spring 220 having two ends that are attached respectively to the top surfaces 130 of the two floats 114, 116, and at least two kicker struts (250 and 255 in FIGS. 9; 240 and 245 in FIG. 19) that are attached respectively to interior side surfaces of the two floats. In the embodiment of FIG. 9, each suspension assembly also comprises two kicker struts 240, 245 that are attached respectively to the top surfaces 130 of the two floats.

Regardless of the number of kicker struts 240, 245, 250, 255 and where they are positioned, the suspension 200 preferably is configured so that portions of the suspension 200 collectively define multiple parallelogram-shaped geometries. This is perhaps best shown in the embodiment of FIG. 9, which has four kicker struts 240, 245, 250, 255. Here, the first kicker strut 240, the third kicker strut 250, a straight line extending from the third pivot joint 230*c* to the seventh pivot joint 230*g*, and a straight line extending from the fourth pivot joint 230*d* to the eighth pivot joint 230*h* are collectively arranged so as to at least substantially delineate a parallelogram. Similarly, the second kicker strut 245, the fourth kicker strut 255, a straight line extending from the fifth pivot joint 230*e* to the ninth pivot joint 230*i*, and a straight line extending from the sixth pivot joint 230*f* to the tenth pivot joint 230*j* are collectively arranged so as to at least substantially delineate another parallelogram. Moreover, the suspension 200 preferably is configured such that, even during the flexing and/or pivoting that occurs during takeoff and landing, the noted portions of the suspension always delineate the parallegram-shaped geometries. In this way, the floats 114, 116 can be maintained in vertical alignment positions at all times during takeoff and landing.

For embodiments where each suspension assembly has only two kicker struts 240, 245 (see FIG. 19), a parallelogram configuration of the suspension 200 is shown by dotted lines. It should be noted that these dotted lines do not represent any physical structure, but instead, merely serve to illustrate the parallelogram configuration of the suspension 200. Although not shown in FIG. 19, it should be understood that another parallelogram configuration is formed between the first float 114 and the first elongated shaft section 225, with the second parallelogram being a mirror image of the parallelogram shown in dotted lines in FIG. 19. In more detail, the first kicker strut 240, a straight line extending from the first pivot joint 230*a* to point AP1, a straight line extending from the first pivot joint 230*a* to the third pivot joint 230*c*, and a straight line extending from the fourth pivot joint 230*d* to point AP1 are collectively arranged so as to at least substantially delineate a parallelogram. Similarly, the second kicker strut 245, a straight line extending from the second pivot joint 230*b* to point AP2, a straight line extending from the second pivot joint 230*b* to the fifth pivot joint 230, and a straight line extending from the sixth pivot joint 230*f* to point AP2 are collectively arranged to at least substantially delineate another parallelogram. Preferably, the suspension is configured such that, even during the flexing and/or pivoting that occurs during takeoff and landing, the noted portions of the suspension always delineate the parallelogram-shaped geometries.

By having the suspension 200 arranged so as to delineate the noted parallelogram-shaped geometries, the first 114 and second 116 floats are prevented from being tilted outwardly under the forces that occur during takeoff and landing. Thus, the floats 114, 116 retain their vertical alignment positions 205 even under considerable load. Accordingly, the suspension 200, by virtue of its generally parallelogram-shaped geometries, provides superior performance. This may be particularly advantageous during rough water operation. It will be appreciated that, for embodiments where the present airplane 10 is a firefighting float plane, firefighting may sometimes be necessary in windy conditions. The improved performance of the present suspension may therefore be particularly advantageous.

Integrated Water Tank

As noted above, the airplane 10 preferably is a firefighting airplane configured to suppress and/or combat wildfires, e.g., by dropping water (from the airplane while in flight) onto a fire below. To achieve this function, the airplane 10 is equipped with a water tank 300 having open and closed configurations. The water tank 300 has a bottom 305 (see FIG. 20) that is closed when the water tank 300 is in its closed configuration and that is open when the water tank 300 is in its open configuration.

In the present embodiments, the airplane 10 has a water tank 300 that is an integrated part of the fuselage 112. This may be referred to herein as an integral water tank. In more detail, the water tank 300 preferably is defined, at least in part, by one or more walls of the fuselage 112. For example, at least one of the sidewalls of the water tank 300 preferably is also a fuselage wall. Thus, at the locations of the fuselage where the water tank is provided, the structure of the fuselage itself preferably defines two sidewalls of the water tank 300. In embodiments where the fuselage has a conventional metal construction (e.g., comprises aluminum panels), sealant can optionally be provided at any lap seams and rivets of the fuselage area(s) that define the water tank, so as to further decrease the likelihood of any water leakage. Preferably, though, a composite fuselage is provided, as noted above.

In the present embodiments, the fuselage walls or surfaces that define at least part (e.g., that define two spaced-apart sidewalls) of the water tank 300 can optionally be portions of an inner skin or inner surface of the fuselage 112. Preferably, in addition to the fuselage itself defining part (e.g., sidewalls) of the water tank 300, the water tank is defined in part by one or more cross-wise walls (e.g., bulkheads), which extend between (optionally so as to be generally perpendicular to) the first 122 and second 124 side regions of the fuselage 112.

In the present embodiments, the aircraft preferably does not (e.g., the integral water tank and the fuselage preferably do not) include mounting reinforcements or hardware or straps configured to hold the water tank in place within the cavity of the aircraft that the fuel or water is to be carried. Thus, the aircraft preferably is (e.g., the integral water tank and the fuselage preferably are) devoid of those items.

In the present embodiments, the sidewalls of the water tank 300 preferably are not spaced apart (e.g., not spaced inwardly) from the adjacent fuselage sidewalls. Moreover, the integral water tank preferably has an interior volume (e.g., a maximum water capacity) in one or more of the ranges described below.

The integral water tank of the present embodiments is in contrast to conventional firefighting planes of the prior art, which have a separate water tank installed within the fuselage (in some cases, on a retrofit basis, i.e., after the aircraft has originally been manufactured). By integrating the water tank 300 into the fuselage 112, unnecessary structure, weight, and space occupancy are eliminated. This allows the volume of an integrated water tank 300 to be larger than a separate water tank that is installed separately within (e.g., nested inside) an existing fuselage 112. By virtue of being able to provide a larger tank volume without all the extra weight that is otherwise required by the structure of a separate water tank built within the fuselage of a conventional airplane, it is possible to obtain higher ratios of water tank volume to aircraft horsepower.

As shown in FIG. 20, the airplane 10 can optionally further include a filling probe (or "scoop") 315 configured to retrieve water from a lake, river or other body of water (e.g., while the airplane is moving along the surface of the body of water). When provided, the filling probe 315 is in fluid communication with the water tank 300, such that water retrieved by the filling probe 315 is delivered into the water tank 300. Preferably, the filling probe 315 is moveable between a first position (or "extended position") 320 and a second position (or "retracted position") 325. The illustrated filling probe 315 is rotatable (e.g., pivotable) between its first and second positions. The filling probe 315 is configured to retrieve water when in the first position 320, and is stowed and/or retracted when in the second position 325. In more detail, the illustrated filling probe 315 is configured to rotate downwardly (e.g., about a pivot point adjacent a rear end of the water tank) into the water stream when moved to the first position 320.

When in the first position 320, the filling probe 315 can be lowered into the water by flying the airplane 10 at or just above the water surface, such as by having the first 114 and second 116 floats skim the water surface. While the airplane 10 flies over or along the water in this manner, the filling probe 315 simultaneously "scoops up" water. Water is retrieved by the filling probe 315 in this manner flows upwardly into the water tank 300. In certain embodiments, a control panel (not shown) is provided to initiate moving the filling probe 315 between its first 320 and second 325 positions. In other cases involving a filling probe that rotates upwardly and downwardly between the first and second positions, the location of the filling probe on the aircraft can be different.

The illustrated filling probe 315 has a first end 330 and a second end 335. Both the first 330 and second 335 ends of the filling probe 315 are open to permit water to pass there through. The first end 330 or end region of the filling probe 315 is attached to (e.g., extends into) the fuselage 112 for delivering water to an interior volume of the integral water tank 300. Preferably, the first end 330 or end region of the filling probe 315 is pivotally attached to the fuselage 112 (or to a mounting structure on the fuselage and/or on the water tank) to allow the filling probe 315 to be pivoted between its first 320 and second 325 positions. When the filling probe 315 is in its first position 320, the second end 335 of the filling probe 315 extends downwardly from the fuselage 112 (or is otherwise extended). When the filling probe 315 is in its second position 325, the filling probe 315 is substantially illustrated parallel to a longitudinal axis LO of the fuselage 112. This type of pivotal arrangement allows the second end 335 of the filling probe 315 to be lowered when needed to fill the water tank 300 and subsequently moved upward and stowed out of the way when not needed.

To facilitate water retrieval, the second end 335 of the filling probe 315 preferably is arcuate (or otherwise bent, curved, or angled) and faces in substantially the same direction as the direction of movement of the airplane 10 when the filling probe 315 is in the extended position 320.

While FIG. 20 shows a filling probe that can be extended downwardly from the fuselage (e.g., from a rear side of the water tank) to a scooping location between the floats, the airplane 10 in the present embodiments (which includes a fuselage-integrated water tank) can alternatively have water scoops that are disposed on (e.g., extendable downwardly from) the floats. In some cases, the present airplane 10 is equipped with a conventional probe system comprising a scoop located in the keel, just forward of main wheels. In still other embodiments, the airplane may not have any water scoops.

Figure 6:
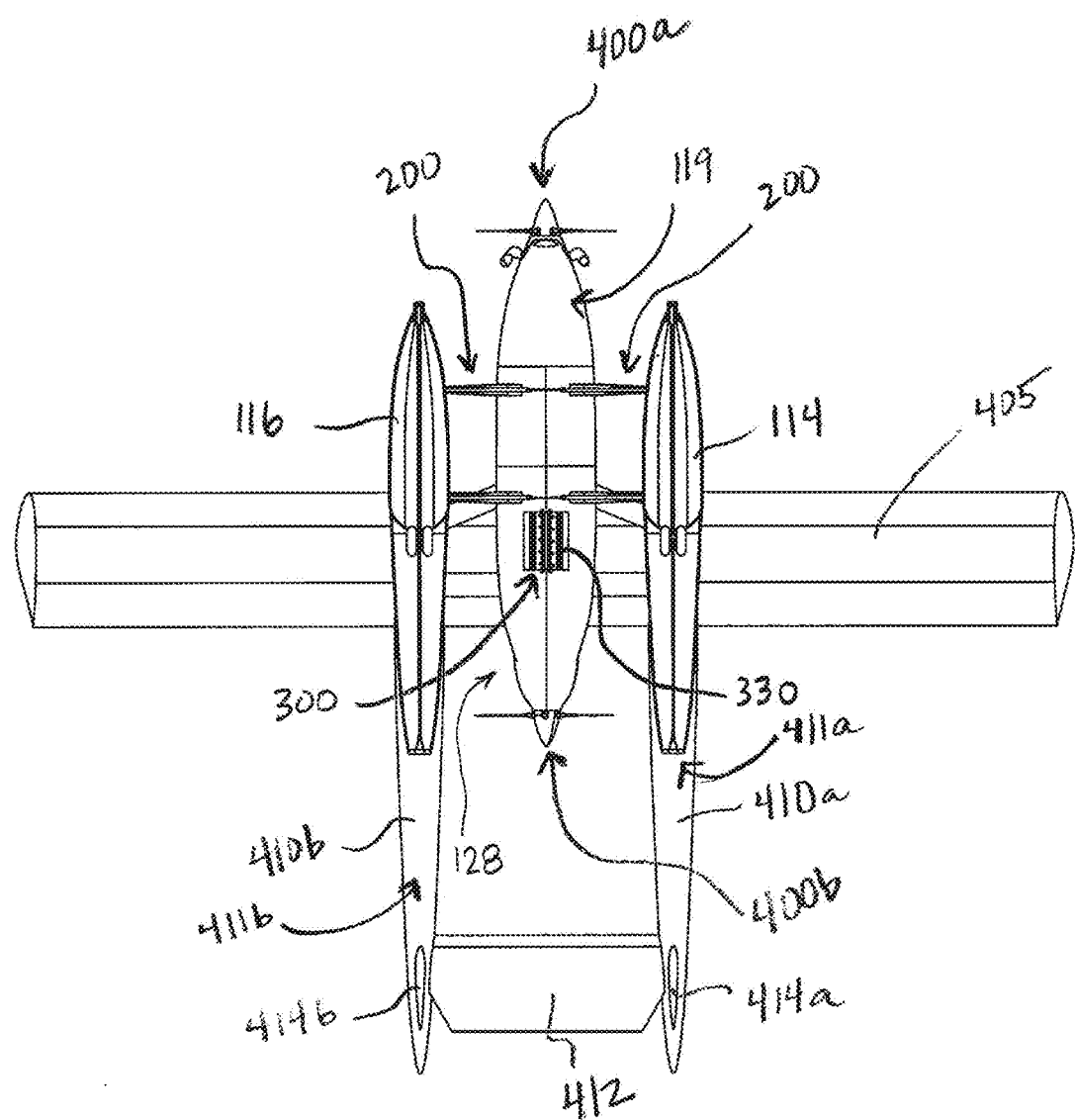
FIG. 6 is a bottom view of the float plane of FIG. 1.
Figure 17:
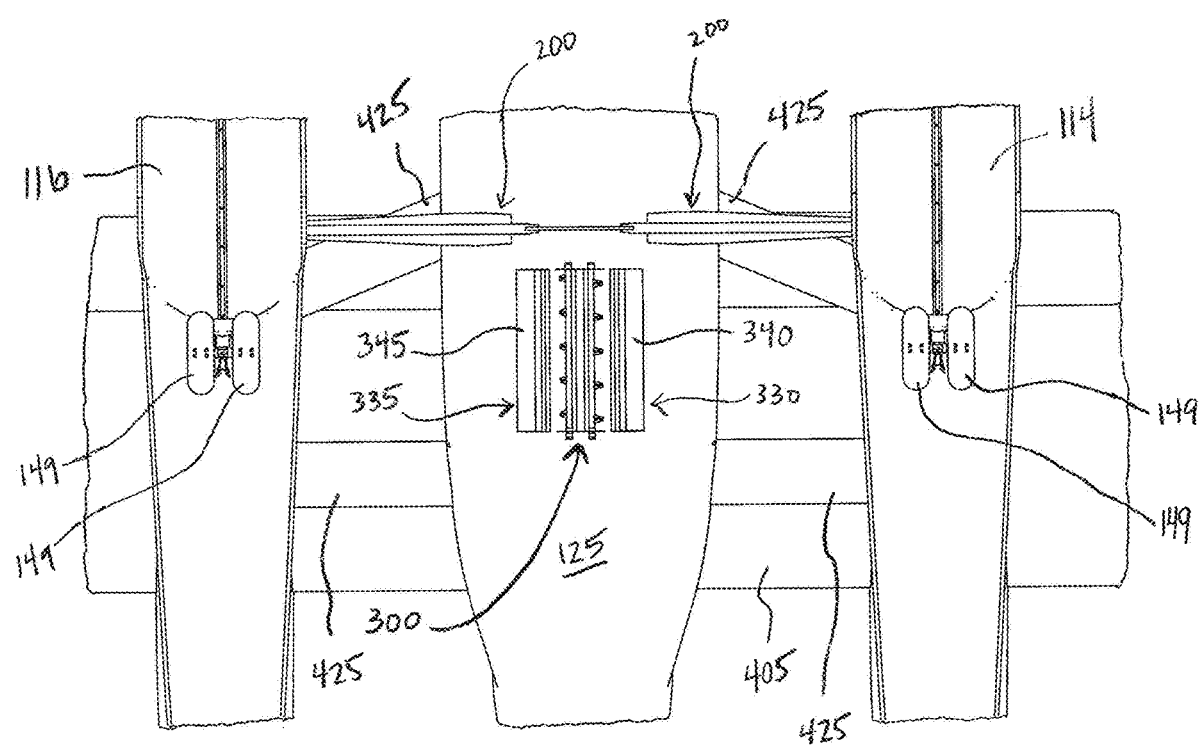
FIG. 17 is a broken-away detailed bottom view of the float plane of FIG. 1.

Preferably, the fuselage 112 is equipped with a door 330, e.g., a bomb bay door, at the bottom 305 of the water tank 300 (see FIGS. 6, 8, and 17). The door 330 is movable between an open position 335 and a closed position. The door 330 is closed when the water tank 300 is in its closed configuration, and the door 330 is open when the water tank 300 is in its open configuration 335. In certain embodiments, the door 330 comprises two panels 340, 345 that adjoin each other when the door 330 is closed and are spaced apart from each other when the door 330 is open. By opening the door 330, water can be dumped from the water tank 300 onto a fire below the airplane 10.

The fuselage 112 can optionally be equipped with a hopper overflow 350 (see FIG. 20) that is configured to remove (e.g., permit drainage of) excess water from the water tank 300. When provided, the hopper overflow 350 is in fluid communication with both the water tank 300 and an environment external to the airplane 10. When the water level in the water tank 300 exceeds a threshold amount of water (as may be designated by a maximum fill line), some of the water can be automatically removed (e.g., may automatically drain) from the water tank 300 via the hopper overflow 350.

The water tank 300 can optionally include (or be coupled with) a gel tank 355 configured to hold a fire-retardant material. The fire-retardant material in the optional gel tank 355 can be a fire-retardant gel. Alternatively, the fire-retardant material can be any fire-retardant material suitable for combating and/or suppressing wildfires. Thus, the water tank 300 can be filled with pure water, or water mixed with another fire-retardant material, such as gel, powder, or a liquid concentrate.

Thus, is the present embodiments, the airplane 10 has an integrated water tank 300. Preferably, it also has a suspension of the nature described above. This, however, is not required in the present embodiments. To the contrary, the present embodiments extend to any firefighting float plane having a fuselage-integrated water tank of the nature described in this section.

Configuration of Fuselage and Water Tank

Figure 2:
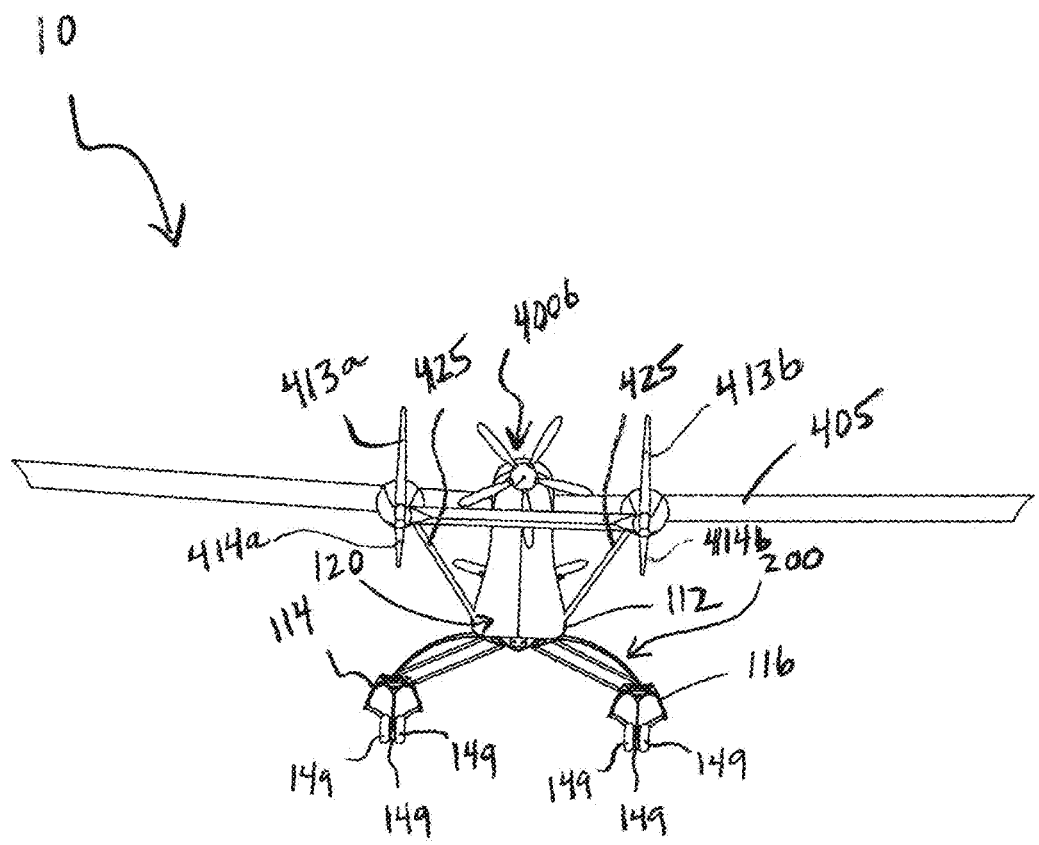
FIG. 2 is a rear view of the float plane of FIG. 1.

In certain embodiments, the bottom region 119 of the fuselage 112 has a greater width than the top region 117 of the fuselage 112. For example, the fuselage 112 can gradually taper outwardly from its top region 117 to its bottom region 119. Thus, the fuselage 112 can advantageously have a generally triangular cross-sectional configuration (e.g., such that the width of the fuselage is smallest adjacent the wing and is greatest adjacent the floats. This is shown in FIGS. 1 and 2. As can be appreciated from the drawings, the generally triangular fuselage shape is for a cross section taken in a plane perpendicular to the longitudinal axis LO (see FIG. 20) of the airplane 10. The fuselage can optionally have such a generally triangular cross-sectional configuration along at least 50%, at least 75%, or substantially an entirety of the length of the fuselage. This can optionally be the case for any embodiment of the present disclosure. If desired, the fuselage can have more abrupt changes in width between its wider bottom region and its narrower top region.

In preferred embodiments, the fuselage 112 and the water tank 300 each have a generally triangular cross-sectional configuration of the nature described above (see FIG. 12). In such cases, the water tank 300 preferably is a fuselage-integrated tank of the nature described above.

By providing the fuselage 112 with a greater width at its bottom region 119 than at its top region 117, a pilot of the airplane 10 can have a good view out of first 121 and second 123 sides of the fuselage 112. Additionally, the wider bottom region 119 of the fuselage 112 can facilitate having an increased water holding capacity for an integrated water tank 300. Thus, by providing a generally triangular cross-sectional configuration for both the fuselage 112 and an integrated water tank 300, the airplane 10 can provide both good pilot viewing and increased water tank capacity.

Figure 12:
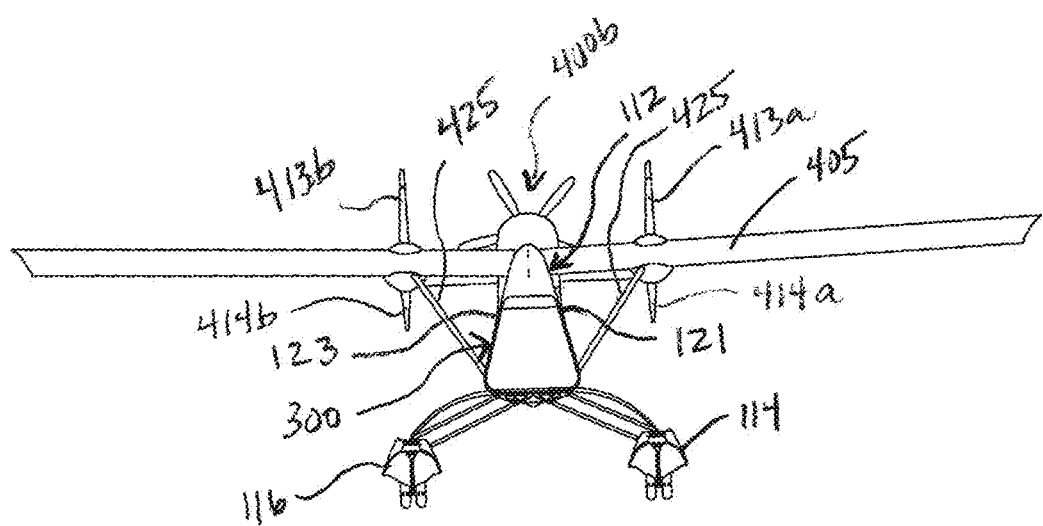
FIG. 12 a schematic cross-sectional view of the fuselage of the float plane of FIG. 1, with the cross section taken through the fuselage and showing a water tank integrated into the fuselage.

As can be appreciated by referring to FIG. 1, the illustrated fuselage 112 has an acute angle between the first side 121 of the fuselage 112 and a vertical airframe axis (defined below), and an acute angle between the second side 123 of the fuselage 112 and a vertical airframe axis. These two acute angles preferably are each between 5° and 45°. They preferably are identical or substantially identical angles. In some cases, each of these angles is between 5° and 30°, such as 10-20° (e.g., about 15°). As shown in FIG. 12, each of the first 121 and second 123 sides of the fuselage 112 can extend at the same angle (i.e., each can extend at a constant angle) along at least 50% of the height wise extent thereof, or along substantially the entire height wise extent thereof. Alternatively, the first 121 and second 123 sides of the fuselage 112 can each extend at varying angles along the height wise extent thereof. If desired, the taper of the sides of the fuselage may be constant in one or more regions of the fuselage (e.g., at a front region) while being curved at one or more other regions (e.g., at a rear region). This can be appreciated by comparing FIGS. 1 and 2. As is also shown in FIGS. 1 and 2, the fuselage can optionally have a flat or generally planar bottom.

Thus, in the present embodiments, the airplane 10 has a generally triangular fuselage and a generally triangular water tank. Preferably, it also has a suspension of the nature described above. This, however, is not required in the present embodiments. To the contrary, the present embodiments extend to any firefighting float plane having the fuselage and water tank configurations described in the section.

Firefighting Float Plane Configuration

In certain embodiments, the airplane 10 is a firefighting float plane having first 400a and second 400b propellers, a wing 405 and two tail booms 410a, 410b. In the present embodiments, the first propeller 400a is located at a nose 126 of the fuselage 112 and faces forward of the firefighting float plane 10, whereas the second propeller 400b is located at a tail region 128 of the fuselage 112 and faces rearward of the firefighting float plane 10. Thus, the two propellers are provided in a push-pull configuration. As shown in FIGS. 5-8, the second, rearward-facing propeller 400b preferably is located between the two tail booms 410a, 410b.

Figure 5:
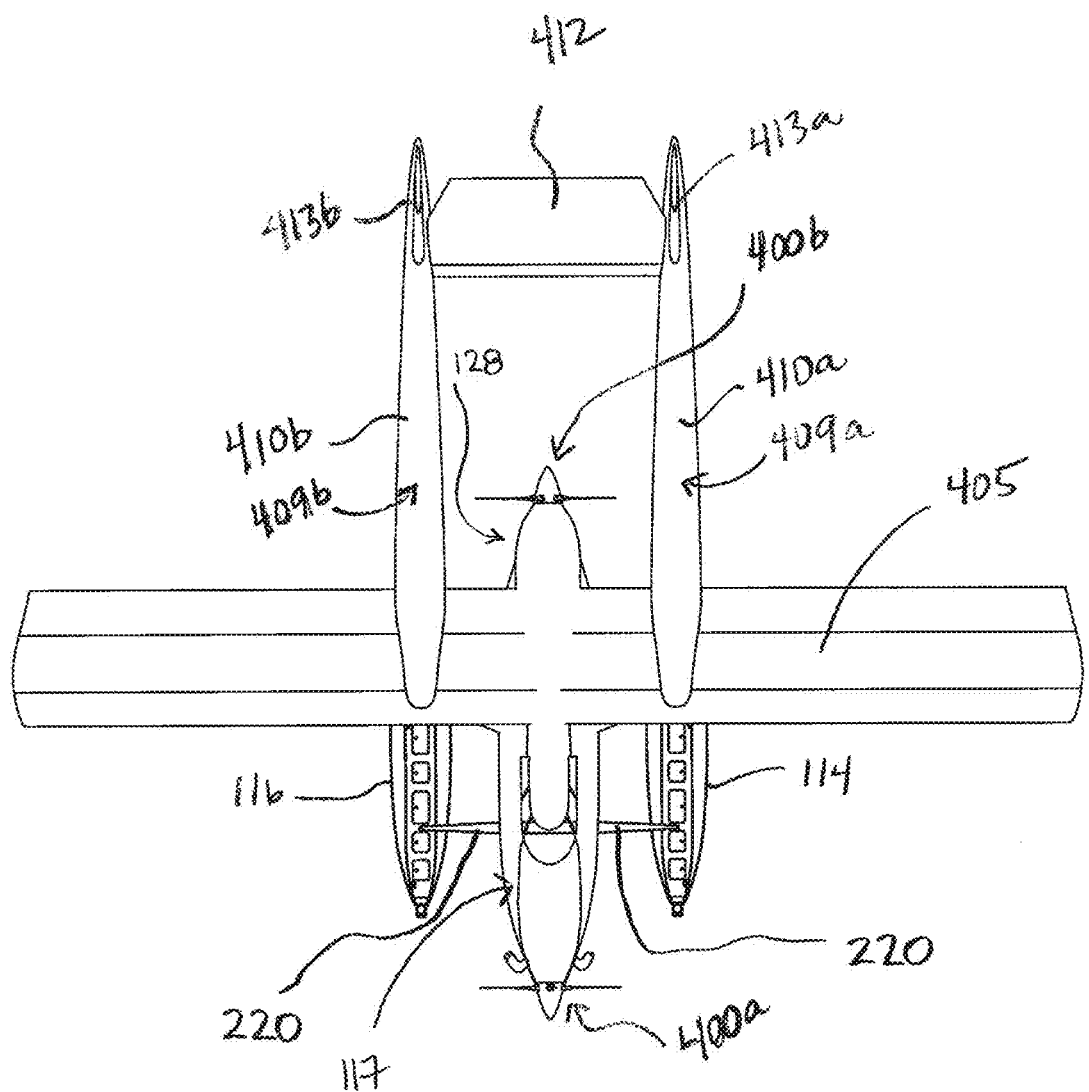
FIG. 5 is a top view of the float plane of FIG. 1.

The two tail booms 410a, 410b are attached to the wing 405 and extend rearwardly thereof. The two tail booms preferably are at least substantially parallel to each other. This is best shown in FIG. 5. A horizontal tail section 412 is attached to and extends between rear end regions of the two tail booms 410a, 410b. The horizontal tail section preferably has a generally planar configuration or an airfoil configuration. In preferred embodiments, the two tail booms 410a, 410b are each laterally aligned with, and positioned above (e.g., so as to be at least substantially parallel to), a respective one of the first 114 and second 116 floats. This is best shown in FIGS. 5 and 6.

Preferably, the tail booms 410a, 410b are formed of a composite material. When provided, the composite material of the tail booms 410a, 410b can be fiberglass, although carbon fiber or another composite material can also be used. Thus, in certain embodiments the fuselage walls and the tail boom walls are both formed of a composite material. In addition, the float walls can optionally be formed of a composite material. In embodiments where the fuselage, tail booms, and/or floats are formed of a composite material, well-known conventional technology methods can be used for the manufacturing methods. As is well known, this technology involves a series of molds in which the various parts of each composite structure are formed, and then the parts are bonded together to form the complete structure.

In preferred embodiments, each of the two tail booms 410a, 410b has an associated vertical stabilizer 413a, 413b. Vertical stabilizer 413a projects upwardly from a top surface 409a of tail boom 410a. Similarly, vertical stabilizer 413b projects upwardly from a top surface 409b of tail boom 410b. Vertical stabilizers 413a, 413b preferably define generally planar vertical surfaces configured to provide aerodynamic stability to the firefighting float plane 10. Each of the two illustrated tail booms 410a, 410b further includes a lower tail 414a, 414b. Lower tail 414a projects downwardly from a lower surface 411a of tail boom 410a, whereas lower tail 414b projects downwardly from a lower surface 411b of tail boom 410b.

The first, forward-facing propeller 400a is coupled to a first engine assembly 415 mounted within the fuselage 112, and the second, rearward-facing propeller 400b is coupled to a second engine assembly 420 mounted within the fuselage 112. The first, forward-facing propeller 400a is located forwardly of the first engine assembly 415, whereas the second, rearward-facing propeller 400b is located rearwardly of the second engine assembly 420. As noted above, this results in an advantageous push-pull configuration in which the first propeller 400a is configured to pull the firefighting float plane 10 while the second propeller 400b is configured to simultaneously push the firefighting float plane 10.

The illustrated propeller arrangement provides a center-thrust configuration, in which the first 400a and second 400b propellers are both laterally aligned with a longitudinal center axis LO of the fuselage 112. This is in contrast to configurations having twin propellers located on the wings and spaced laterally apart from each other and from a longitudinal center axis LO of the fuselage 112. The push-pull, center-thrust configuration of the present embodiments provides increased safety for the firefighting float plane 10. For instance, in the event that one of the propellers 400a, 400b fails, malfunctions, or is damaged, the remaining propeller 400a, 400b can still operate. Each propeller and engine assembly preferably has sufficient power to fly the airplane even if the other propeller and engine assembly stops working. Additionally, since both propellers 400a, 400b are centrally aligned, the remaining functioning propeller 400a, 400b can provide an advantageous level of flight control as compared to situations where the remaining functioning propeller is off-center.

As shown, in FIG. 20, while both propellers 400a, 400b are at center-thrust positions, they are preferably not co-axial. Instead, the rotation axis P1A of the first propeller 400a is spaced apart from the rotation axis P2A of the second propeller 400b. In more detail, the embodiment illustrated in FIG. 20 has the second propeller at a higher position on the fuselage than where the first propeller is on the fuselage. More will be said later of this preferred, but optional feature. In alternate embodiments, the two propellers are co-axial.

The first 415 and second 420 engine assemblies preferably have a combined (total) power in a range of between 2,000 horsepower and 4,000 horsepower. For example, the combined power can be between 2,200 horsepower and 3,800 horsepower, or between 2,500 horsepower and 3,500 horsepower, such as between 2,600 horsepower and 3,200 horsepower. In one non-limiting example, the total power is about 2,800 HP.

In combination with having the total power in any range mentioned above, the power of each engine preferably is 1,000 HP or greater, such as between 1,000 HP and 1,800 HP, e.g., about 1,400 HP.

In preferred embodiments, the wing 405 is located at a higher position than a pilot position 360 of the firefighting float plane 10. This way, the wing does not obstruct downward viewing from the pilot position 360. This ensures that the pilot's line of sight is not blocked substantially when the pilot looks down at a fire.

The wing 405 is located at a higher position than is a rotation axis P1A of the first, forward-facing propeller 400a but is located at a lower position than is a rotation axis P2A of the second, rearward-facing propeller 400b. This is shown in FIG. 20. The preferred elevated location of the second propeller 400b helps protect it (and the associated second engine assembly 420) from water spraying up from the floats.

In the embodiments illustrated, first 425a and second 425b pairs of wing struts 425 are preferably provided (see FIGS. 3 and 4). The first pair 425a of wing struts 425 extends from the first side 121 of the fuselage 112 to the wing 405. The second pair 425b of wing struts 425 extends from the second side 123 of the fuselage 112 to the wing 405. The wing struts 425 are rigid and configured to support the wing 405 on the fuselage 112.

The region of the fuselage 112 where the illustrated wing struts 425a, 425b are located is particularly rigid. It is therefore advantageous to locate the water tank at this reinforced region of the fuselage. Preferably, the water tank 300 has a vertical center axis located longitudinally between the two wing struts 425 of each pair 425a, 425b. As shown by the dotted lines in FIG. 3, the water tank 300 is disposed substantially entirely between, optionally entirely between, the most widely spaced apart portions of the two wing struts 425 of each pair. More generally, the water tank 300 preferably is aligned longitudinally with the wing 405, as shown in FIG. 20. Thus, the water tank 300 preferably is disposed adjacent the locations where the wing struts 425 attach to the wing 405.

The aircraft configuration described in this section can optionally be used in any embodiment of the present disclosure. In the present embodiments, the firefighting float plane can optionally have a suspension of the nature described above. This, however, is not required in the present embodiments. Additionally or alternatively, the water tank of the firefighting float plane in the present embodiments can optionally be integrated into the fuselage. Moreover, the fuselage and water tank can optionally have the generally triangular configurations described above. These features, however, are not required in the present embodiments.

Ratio of Water Tank Capacity to Power of Engine Assemblies

In certain embodiments, the holding capacity of the water tank 300 is greater than 1,000 gallons. For example, the water tank 300 preferably has a capacity in the range of 900-1,800 gallons, such as in the range of 1,000-1,800 gallons, e.g., about 1,600 gallons. In one example, the water tank capacity is in the range of 1,400-2,000 gallons, such as 1,600-2,000 gallons. In some embodiments, the total power of the two engine assemblies 415, 420 is less than 4,000 horsepower, or less than 3,500 horsepower, or even less than 3,000 horsepower, e.g., in the range of 2,000-2,950 horsepower, such as about 2,800 horsepower. In certain embodiments, each of the two engine assemblies has a power of about 1,400 horsepower. If desired, the first engine assembly 415 can have more power than the second engine assembly 420, such as 1,600 horsepower for the first engine assembly 415 and 1,200 horsepower for the second engine assembly 420.

Preferably, the firefighting float plane 10 has a ratio of holding capacity of the water tank 300 to total power of the two engine assemblies 415, 420 that is greater than 0.5 gallons/horsepower in combination with the holding capacity of the water tank 300 being greater than 1,000 gallons (optionally in the range of 1,400-2,000 gallons, such as 1,600-2,000 gallons) and the total power of the two engine assemblies 415, 420 being less than 4,000 horsepower (optionally in the range of 2,000-2,950 horsepower). For example, the ratio can be greater than 0.52 gallons/horsepower, such as between 0.53 gallons/horsepower and 0.57 gallons/horsepower, e.g., about 0.55 gallons/horsepower.

The desired weight of the firefighting float plane 10 limits the feasible size of the water tank 300. Preferably, the airplane 10 has an empty weight of 15,000 pounds or less, such as 13,000 pounds or less, e.g., about 10,000 pounds. The empty weight of the airplane 10 refers to the weight measurement of the airplane 10 taken without water in the water tank 300 and without the weight of people and cargo. By providing such a reduced-weight aircraft, the water tank 300 can be provided with a surprisingly large water tank without requiring nearly as much horsepower as a conventional, heavier-weight firefighting aircraft.

Preferably, the wing 405 of the aircraft 10 has a wing area in a range of from 500 square feet to 900 square feet, such as from 600 square feet to 800 square feet, e.g., from 650 to 750 square feet. Additionally or alternatively, the wingspan can be in a range of from 50 to 150 feet, such as from 75 to 125 feet. In one non-limiting example, the wing area is about 682 square feet and the wingspan is about 75 feet.

As shown in FIG. 20, the airplane 10 can have one or more seats 430 for seating one or more persons. Where a multi-seat configuration is provided, such as two seats 430, the seats 430 can be aligned in a tandem configuration, i.e., with one seat 430 behind the other, as shown in FIG. 20. Thus, the airplane 10 in any embodiment of the present disclosure can optionally be a two-place aircraft.

In the present embodiments, the firefighting float plane can optionally have the type of aircraft configuration described above in the section preceding this one. This, however, is not required in the present embodiments. To the contrary, the present embodiments extend to any firefighting float plane having the parameters noted above for the water tank size, horsepower, and ratio of water tank capacity to horsepower. In the present embodiments, the firefighting float plane can optionally have a suspension of the nature described above. Additionally or alternatively, the water tank of the firefighting float plane in the present embodiments can optionally be integrated into the fuselage. Moreover, the fuselage and water tank can optionally have the generally triangular configurations described above. These features, however, are not required in the present embodiments.

Thus, embodiments of the float plane 10 are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A firefighting float plane comprising:
   a fuselage, the fuselage being elongated along a longitudinal axis and having a bottom and a top, the fuselage having a generally triangular cross-sectional configuration, such that the fuselage gradually tapers inwardly from the bottom of the fuselage to the top of the fuselage, and
   first and second floats, the first and second floats being spaced apart from each other,
   the float plane including a water tank having closed and open configurations, the water tank when in its closed configuration having a closed bottom, the water tank when in its open configuration having an open bottom, the water tank having a generally triangular cross-sectional configuration, wherein the generally triangular cross-sectional configuration of the fuselage and the generally triangular cross-sectional configuration of the water tank are for cross sections taken in a plane perpendicular to the longitudinal axis of the fuselage, and the fuselage itself defines sidewalls of the water tank.

2. The firefighting float plane of claim 1 wherein the water tank has a top region and a bottom region, the water tank having a greater width at the bottom region than at the top region.

3. The firefighting float plane of claim 2 wherein the water tank tapers outwardly from the top region to the bottom region.

4. A firefighting float plane comprising:
   a fuselage, the fuselage having a generally triangular cross-sectional configuration, and
   first and second floats, the first and second floats being spaced apart from each other,
   the float plane including a water tank having closed and open configurations, the water tank when in its closed configuration having a closed bottom, the water tank when in its open configuration having an open bottom, the water tank having a generally triangular cross-sectional configuration, and
   the firefighting float plane further comprising:
   a wing, and
   first and second pairs of wing struts, the first pair of wing struts extending from a first side of the fuselage to the wing, the second pair of wing struts extending from a second side of the fuselage to the wing, the water tank having a vertical center axis located between the two wing struts of each pair of wing struts.

5. The firefighting float plane of claim 4 wherein the water tank is an integrated part of the fuselage, such that the water tank is defined at least in part by one or more walls of the fuselage.

6. A firefighting float plane comprising:
   a fuselage,
   first and second propellers, the first propeller being located at a nose of the fuselage, the first propeller facing forward of the firefighting float plane, the second propeller facing rearward of the firefighting float plane,
   a wing, the wing being located at a higher position than a pilot position of the firefighting float plane so as not to obstruct downward viewing from the pilot position, two tail booms, and first and second floats, the first and second floats being spaced apart from each other and mounted to the fuselage, the fuselage being equipped with a water tank having closed and open configurations, the water tank when in its closed configuration having a closed bottom, the water tank when in its open configuration having an open bottom, wherein the second, rearward-facing propeller is located between the two tail booms, the wing is located at a higher position than a rotation axis of the first, forward-facing propeller but is located at a lower position than a rotation axis of the second, rearward facing propeller.

7. The firefighting float plane of claim 6 wherein the first, forward-facing propeller is coupled to a first engine assembly mounted within the fuselage, and the second, rearward-facing propeller is coupled to a second engine assembly mounted within the fuselage.

8. The firefighting float plane of claim 6 wherein the first and second floats project longitudinally rearward further than does the fuselage.

9. The firefighting float plane of claim 7 wherein the first and second engine assemblies have a combined total power in a range of between 2,000 horsepower and 4,000 horsepower.

10. The firefighting float plane of claim 9 wherein the water tank has a holding capacity of greater than 1,000 gallons.

11. The firefighting float plane of claim 6 wherein the water tank is aligned longitudinally with the wing.

12. The firefighting float plane of claim 6 wherein the fuselage and tail booms are formed of a composite material.

13. The firefighting float plane of claim 12 wherein the composite material comprises fiberglass.

14. The firefighting float plane of claim 6 further comprising first and second pairs of wing struts, the first pair of wing struts extending from a first side of the fuselage to the wing, the second pair of wing struts extending from a second side of the fuselage to the wing, the water tank having a vertical center axis located between the two wing struts of each pair of wing struts.

15. The firefighting float plane of claim 6 wherein the first and second floats each comprise a composite material.

16. The firefighting float plane of claim 6 wherein each of the two tail booms is laterally aligned with and positioned above a respective one of the first and second floats.

17. A firefighting float plane comprising:

a fuselage, a wing, first and second pairs of wing struts, the first pair of wing struts extending from a first side of the fuselage to the wing, the second pair of wing struts extending from a second side of the fuselage to the wing, and first and second floats, the first and second floats being spaced apart from each other and mounted to the fuselage, the fuselage being equipped with a water tank having closed and open configurations, the water tank having a vertical center axis that is located between the two wing struts of each pair of wing struts, the water tank when in its closed configuration having a closed bottom, the water tank when in its open configuration having an open bottom, and wherein the firefighting float plane has a ratio of holding capacity of the water tank to total engine power of greater than 0.5 gallons/horsepower in combination with the holding capacity of the water tank being greater than 1,000 gallons and the total engine power being less than 4,000 horsepower.

18. The firefighting float plane of claim 17 comprising a first propeller coupled to a first engine assembly and a second propeller coupled to a second engine assembly, wherein the first propeller faces forward of the firefighting float plane while the second propeller faces rearward of the firefighting float plane.

19. The firefighting float plane of claim 17 wherein the wing of the firefighting float plane has a wing area in a range of from 500 square feet to 900 square feet.

20. The firefighting float plane of claim 19 wherein the water tank is an integrated part of the fuselage, such that the water tank is defined at least in part by one or more walls of the fuselage.

21. The firefighting float plane of claim 18 further comprising two tail booms, the second, rearward-facing propeller being located between the two tail booms.

22. The firefighting float plane of claim 18 wherein a ratio of holding capacity of the water tank to total power of the two engine assemblies is greater than 0.52 gallons/horsepower.

* * * * *